US011989895B2

(12) United States Patent
Meiners

(10) Patent No.: US 11,989,895 B2
(45) Date of Patent: May 21, 2024

(54) CAPTURING ENVIRONMENTAL FEATURES USING 2D AND 3D SCANS

(71) Applicant: PassiveLogic, Inc., Salt Lake City, UT (US)

(72) Inventor: Justin Meiners, Murray, UT (US)

(73) Assignee: PassiveLogic, Inc, Holladay, UT (US)

( * ) Notice: Subject to any disclaimer, the term of this patent is extended or adjusted under 35 U.S.C. 154(b) by 302 days.

(21) Appl. No.: 17/459,084

(22) Filed: Sep. 15, 2021

(65) Prior Publication Data
US 2023/0083703 A1 Mar. 16, 2023

(51) Int. Cl.
*G06T 7/521* (2017.01)
*G06N 20/00* (2019.01)
*G06T 17/10* (2006.01)
*G06V 10/25* (2022.01)

(52) U.S. Cl.
CPC .............. *G06T 7/521* (2017.01); *G06N 20/00* (2019.01); *G06T 17/10* (2013.01); *G06V 10/25* (2022.01)

(58) Field of Classification Search
CPC ......... G06T 7/521; G06T 17/10; G06T 17/00; G06T 19/006; G06T 2210/04; G06T 2219/004; G06N 20/00; G06V 10/25
See application file for complete search history.

(56) References Cited

U.S. PATENT DOCUMENTS

| 10,445,895 | B2 | 10/2019 | Knorr et al. |
| 10,785,413 | B2 | 9/2020 | Malia et al. |
| 2021/0208262 | A1 | 7/2021 | Silver et al. |
| 2022/0406013 | A1* | 12/2022 | Xiong ............... G06T 19/20 |

OTHER PUBLICATIONS

Henry, P., Krainin, M., Herbst, E., Ren, X. and Fox, D., 2014. RGB-D mapping: Using depth cameras for dense 3D modeling of indoor environments. In Experimental robotics: The 12th international symposium on experimental robotics (pp. 477-491). Springer Berlin Heidelberg.*
Han, J., Liu, Y., Rong, M., Zheng, X. and Shen, S., 2023. FloorUSG: Indoor floorplan reconstruction by unifying 2D semantics and 3D geometry. ISPRS Journal of Photogrammetry and Remote Sensing, 196, pp. 490-501.*
Majercik, A., Crassin, C., Shirley, P. and McGuire, M., 2018. A ray-box intersection algorithm and efficient dynamic voxel rendering. Journal of Computer Graphics Techniques vol. 7(3), pp. 66-81.*
Alzantot et al., "CrowdInside: Automatic Construction of Indoor Floorplans", Sep. 17, 2012, DOI: 10.1145/2424321.2424335 Source: arXiv.

(Continued)

*Primary Examiner* — Zhitong Chen
(74) *Attorney, Agent, or Firm* — Genie Lyons

(57) ABSTRACT

During capture of a three dimensional mesh of an environment, a combination of user inputs and machine learning is used to place annotations within the three dimensional mesh environment interactively. When the full mesh is assembled, the annotations are used to detect which portions of the three-dimensional mesh make up the features of interest. Additional features can be derived from these results, such as a 2D image of a floor plan.

20 Claims, 20 Drawing Sheets

(56) References Cited

OTHER PUBLICATIONS

ARRayCastQuery, Apple Developer Documentation Kit, copyright 2021, https://developer.apple.com/documentation/arkit/arraycastquery, last accessed Dec. 15, 2021.
ARRaycastResult, Apple Developer Documentation Kit, copyright 2021, https://developer.apple.com/documentation/arkit/arraycastresult, last accessed Dec. 15, 2021.
Raycast(_:), Apple Developer Documentation Kit, copyright 2021, https://developer.apple.com/documentation/arkit/arsession/3132065-raycast/t, last accessed Dec. 15, 2021.
Scratchapixel 2.0, Ray Tracing: Rendering a Triangle, copyright 2016-2021, https://www.scratchapixel.com/lessons/3d-basic-rendering/ray-tracing-rendering-a-triangle, last viewed Dec. 15, 2021.
Written Opinion of the International Searching Authority for International application No. PCT/US2022/043838, dated Dec. 22, 2022.
Written Opinion of the International Searching Authority for International application No. PCT/US22/41528, dated Apr. 7, 2023.

* cited by examiner

CAPTURING ENVIRONMENTAL FEATURES USING 2D AND 3D SCANS

FIELD OF INVENTION

The present disclosure relates to extracting features from scans of building; more specifically, extracting features using two dimensional and three dimensional scans working together.

SUMMARY

This summary is provided to introduce a selection of concepts in a simplified form that are further described below in the Detailed Description section. This summary does not identify required or essential features of the claimed subject matter. The innovation is defined with claims, and to the extent this Summary conflicts with the claims, the claims should prevail.

In general, some technologies described herein describe capturing environmental features using 2D and 3D scans.

In embodiments, a method of detecting a region of interest in an image of a space is disclosed, the method comprising: obtaining a plurality of depth measurements captured by a depth sensor attached to a device, the depth measurements defining distances from the depth sensor to respective points in the space using a three dimensional grid; declaring those depth measurements a portion of the space; obtaining a detected region of interest in the image of the portion of the space, captured by a machine learning recognition system using two dimensions of the three dimensional grid; mapping the detected region of interest onto the three dimensional grid in two dimensions to make a two dimensional detected region of interest; obtaining a finished depth measurement three dimensional grid of the space; projecting the two dimensional detected region of interest onto the finished depth measurement grid of the space to make a projected three dimensional shape; discovering the intersection between the projected three dimensional shape and the finished depth measurement three dimensional grid of the space as a region of interest.

In embodiments, the region of interest is a wall or a window.

In embodiments, obtaining a detected region of the portion of the room comprises accepting an annotation placement on a surface of a representation of the two-dimensional grid.

In embodiments, projecting the two dimensional detected region of interest onto the finished depth measurement grid of the space to make a projected three dimensional shape comprises creating a ray that intersects the three dimensional grid using the annotation placement, creating an intersection point.

In embodiments, adjacent faces of the intersection point are identified to create a wall portion.

In embodiments, the wall portion is flattened along a z axis, with a marker pointing to the inside of the space, creating a 2-D marker oriented in space.

In embodiments, there are multiple 2-D markers and the multiple 2-D markers oriented in space are extended to create a 2-D outline of the space.

In embodiments, the method further comprises placing a marker on the surface of the representation of the two-dimensional grid marking a wall associated with the annotation.

In embodiments, obtaining a detected region of interest in the portion of the room comprises capturing the detected region of interest using a two dimensional camera with image recognition software using a transformation of two dimensions of the three dimensional grid.

In embodiments, capturing the detected region of interest using a two dimensional camera with image recognition software using two dimensions of the three dimensional grid further comprises capturing at least three points that correspond to object corners.

In embodiments, a system to generate a 3D scan of a space with regions of interest marked is disclosed, the system comprising a 3D scanner operationally able to scan a portion of a space in three dimensions creating a 3D scan portion, and operationally able to scan the whole space creating a whole 3D scan; a 2D scanner operationally connected to the 3D scanner, the 2D scanner operationally able to use machine learning to detect regions of interest within a 2D scan and operationally able to mark the regions of interest in the 2D scan using two of the three dimensions from the 3D scan portion; a combiner operationally able to mark the 2D scan regions of interest with two dimensions of the 3D scan portion to create a ray; a post processor operationally able to position the ray with the whole 3D scan to create a 3D scan of a space with the regions of interest marked.

In embodiments, the semantic feature comprise walls, doors, windows, or equipment.

In embodiments, the post processor is operationally able to determine a wall portion by intersecting the ray with the whole 3D scan along a third dimension axis.

In embodiments, a non-transitory computer readable storage medium storing instructions for performing capture of regions of interest wherein the instructions, when executed by a processor, cause the processor to perform steps is disclosed, the steps including: receiving, by a LiDAR system mounted on a device, a partial 3D scan of a space; receiving by a 2D camera mounted on the device a 2D detected region of interest; marking the 2D detected region of interest within the partial 3D scan creating a 2D marked ROI; receiving a finished 3D scan; and marking the 2D marked ROI in the finished 3D scan intersection as the region of interest.

In embodiments, receiving by a 2D camera mounted on the device a 2D detected region of interest comprises accepting 2D user input marking the 2D detected region of interest.

In embodiments, the processor further performs the steps of receiving by a 2D camera mounted on the device a second 2D detected region of interest; marking the second 2D detected region of interest within the partial 3D scan in two dimensions; intersecting the second 2D region of interest with the finished 3D scan; creating a second 3D scan intersection; marking the second 3D scan intersection as the second region of interest; extending the 2D detected region of interest and the second 2D detected region of interest to an intersection point to create an extended 2D detected region of interest and a second 2D detected region of interest; and marking the extended 2D detected region of interest and the second 2D detected region of interest as a wall floor plan portion.

In embodiments, intersecting the 2D detected region of interest with the finished 3D scan creating a 3D scan intersection further comprises identifying adjacent faces with a similar orientation within the finished 3D scan; and wherein intersecting the 2D detected region of interest with the finished 3D scan creating a 3D scan intersection comprises flattening the wall floor plan portion into a 2D marker.

In embodiments, receiving a 2D detected region of interest comprises a machine learning image recognition system using a camera feed from the 2D camera mounted on the device to detect a region of interest.

In embodiments, intersecting the second 2D region of interest with the 3D scan creating a 3D scan intersection comprises: locating a surface on the finished 3D scan; creating a 3D extension of the three points of user interest marking the region around a ray at 90° to the surface of the finished 3D scan; marking the intersection of the 3D extension of the three points of user interest with the finished 3D scan as the region of interest.

In embodiments, the region of interest is a wall, a door, a window, a bookcase, a desk, a light fixture, a table, or a sensor.

These, and other, aspects of the invention will be better appreciated and understood when considered in conjunction with the following description and the accompanying drawings. The following description, while indicating various embodiments of the embodiments and numerous specific details thereof, is given by way of illustration and not of limitation. Many substitutions, modifications, additions or rearrangements may be made within the scope of the embodiments, and the embodiments includes all such substitutions, modifications, additions or rearrangements.

BRIEF DESCRIPTION OF THE FIGURES

Non-limiting and non-exhaustive embodiments of the present embodiments are described with reference to the following FIGURES, wherein like reference numerals refer to like parts throughout the various views unless otherwise specified.

FIG. 7B discloses a slice of a 3D mesh scan with the floorplan drawn in.

Figure 1:
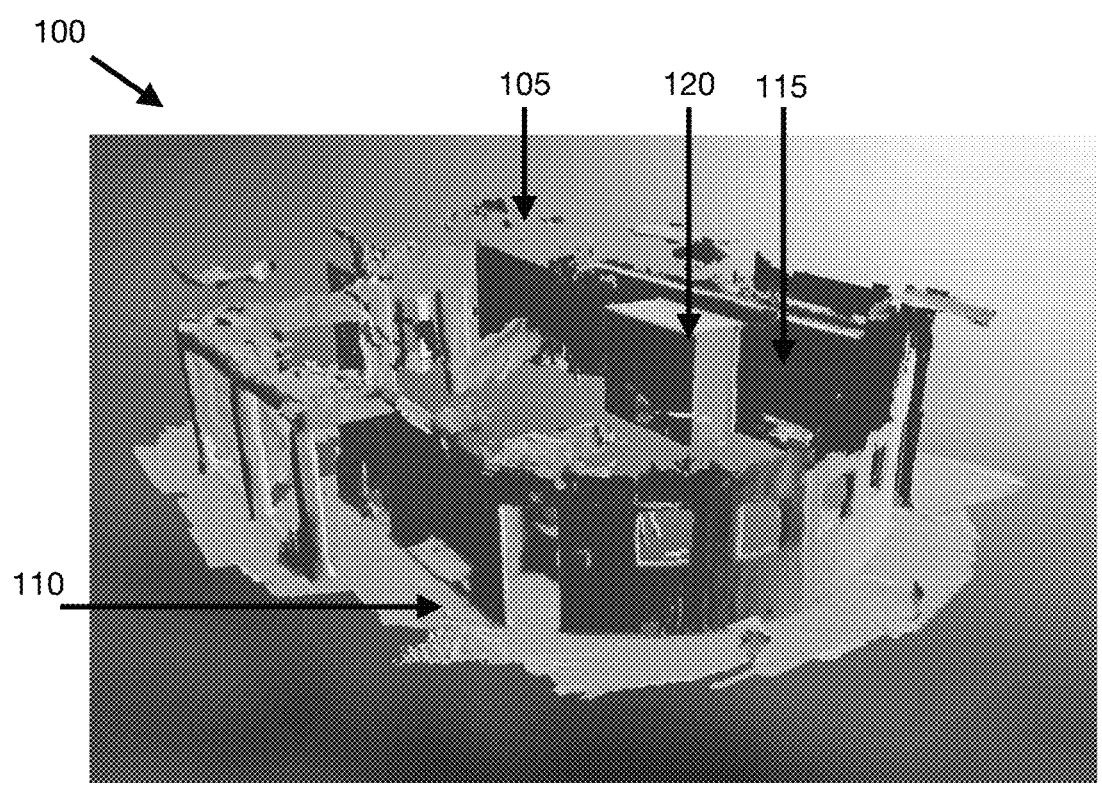
FIG. 1 is a LIDAR scan showing unstructured data artifacts.

Corresponding reference characters indicate corresponding components throughout the several views of the drawings. Skilled artisans will appreciate that elements in the FIGURES are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION

Disclosed below are representative embodiments of methods, computer-readable media, and systems having particular applicability to systems and methods for automatically creating wiring diagrams. Described embodiments implement one or more of the described technologies.

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments. "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order.

For convenience, the present disclosure may be described using relative terms including, for example, left, right, top, bottom, front, back, upper, lower, up, and down, as well as others. It is to be understood that these terms are merely used for illustrative purposes and are not meant to be limiting in any manner.

In addition, it is appreciated that the figures provided herewith are for explanation purposes to persons ordinarily skilled in the art and that the drawings are not necessarily drawn to scale. To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may be referred to as a "system." Furthermore, the present embodiments may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present embodiments may be written in any combination of one or more programming languages.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). "Program" is used broadly herein, to include applications, kernels, drivers, interrupt handlers, firmware, state machines, libraries, and other code written by programmers (who are also referred to as developers) and/or automatically generated. "Optimize" means to improve, not necessarily to perfect. For example, it may be possible to make further improvements in a program or an algorithm which has been optimized.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," and "in one embodiment."

The technical character of embodiments described herein will be apparent to one of ordinary skill in the art, and will also be apparent in several ways to a wide range of attentive readers. Some embodiments address technical activities that are rooted in computing technology, such as providing sensors which use power flexibly depending on energy available in the environment without requiring recoding. This requires much less work to implement, and gives sensors that require battery changes much less frequently than similar items. Other advantages based on the technical characteristics of the teachings will also be apparent to one of skill from the description provided.

I. Overview

Augmented Reality AR/LiDAR (Augmented Reality/Light Detection And Ranging) allows one to capture a a detailed cloud of 3D points, with reasonable accuracy and precision, in real-time, simply by walking through a building and surveying the area with the camera. This cloud of 3D points may be automatically structured to create a 3D mesh. However, as shown with reference to FIG. 1 at 100, a representative LiDAR mesh appears as unstructured "triangle soup" with a lot of noise and artifacts 105, 110, making it very difficult to discern the important aspects of the scene, such as a wall 115, from furniture, appliances, and other material present. Furthermore, the amount of raw detail makes it difficult to extract regions of interest such as walls, windows, doors, etc. For example buildings contain many flat "wall-like" surfaces which are not walls, e.g., 120, a cupboard, making it difficult to determine a geometric criteria for designating a wall from things that are not a wall. The definition of these features heavily depends on context.

Methods and systems are disclosed herein where the 3D environment is captured, as if many features could be detected intelligently. A 3D point cloud, or 3D mesh of the environment, is captured using a depth measuring system, such as LiDAR simultaneously with the same system being captured in an Artificial Reality (AR) environment. We then use a combination of user inputs and machine learning to place annotations on the AR environment. These annotations are placed using 2D coordinates from the 3D LiDAR system. The annotations act as hints to identify the general location of features we care about. However, the initial placement of the annotations do not indicate exactly where a feature is located; rather they suggest general areas to look for in the 3D mesh to find the feature of interest. Once the 3D mesh has been completed, in a post-processing step, the 2D annotations are transformed into specific locations in the 3D space, locating the features of interest. Delaying the placement until post-processing allows significant improvements in accuracy and consistency.

Two types of annotations are disclosed: those that are placed by a person on specific features of interest, such as a wall, and those that are recognized by a machine learning system. Both types of annotations are initially placed while the mesh is being constructed, and then have the placement finalized in a post-processing step. Other annotation types are possible, such as recording the position of the device periodically to get the path that was traveled. This could be used to detect the floor or other features.

II. Suitable Computing Environment

Figure 2:
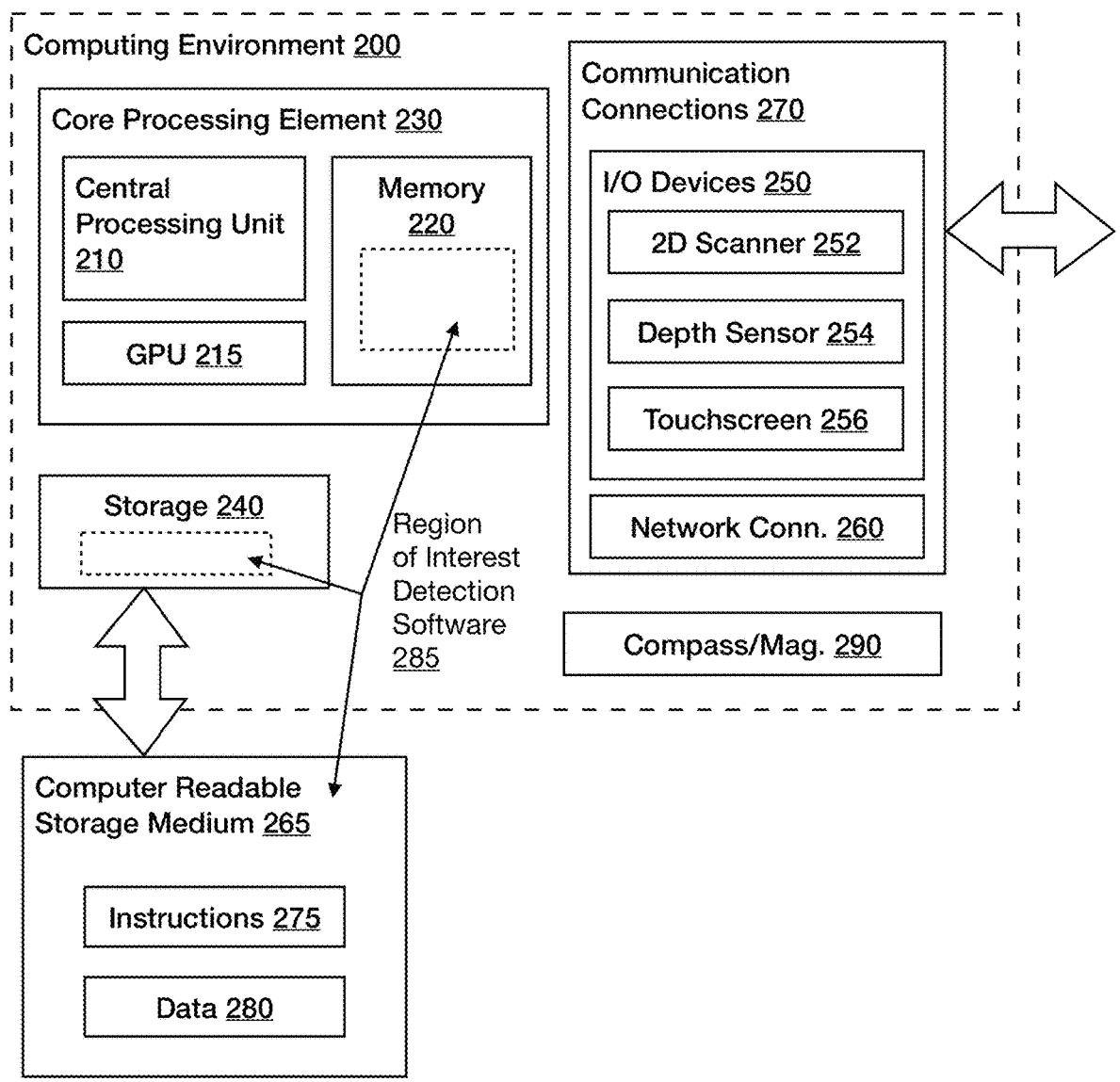
FIG. 2 is a is a functional block diagram showing an exemplary embodiment of some features of a scanning device.

FIG. 2 illustrates a generalized example of a suitable computing environment 200 in which described embodiments may be implemented. The computing environment 200 is not intended to suggest any limitation as to scope of use or functionality of the disclosure, as the present disclosure may be implemented in diverse general-purpose or special-purpose computing environments.

With reference to FIG. 2, the core processing is indicated by the core processing 230 box. The computing environment 200 includes at least one central processing unit 210, a GPU 215, and memory 220. The central processing unit 210 executes computer-executable instructions and may be a real or a virtual processor. The memory 220 may be volatile memory (e.g., registers, cache, RAM), non-volatile memory (e.g., ROM, EEPROM, flash memory, etc.), or some combination of the two. The memory 220 stores software 285 implementing the described methods of capturing building features using depth scans.

A computing environment may have additional features. For example, the computing environment 200 includes storage 240 and communication connections 270, which may include one or more input/output devices 250, one or more network connections (e.g., wired, wireless, etc.) 260 as well as other communication connections (not shown). Communication connections 270 may include one or more wireless transceivers for performing wireless communication and/or one or more communication ports for performing wired communication. In embodiments, communication device 270 may be configured to receive captured building features using 2D and 3D sensors. The input/output devices may comprise a two-dimensional camera 252. A depth sensor 254, such as a LiDAR (Light Detection And Ranging) system may also be included, as well as a touchscreen 256, which allows users to enter information, and for pictorial information, etc., to be displayed. An interconnection mechanism (not shown) such as a bus, controller, or network interconnects the components of the computing environment 200. Typically, operating system software (not shown) provides an operating environment for other software executing in the computing environment 200, and coordinates activities of the components of the computing environment 200. The computing system may also be distributed; running portions of the software 285 on different CPUs.

The storage 240 may be removable or non-removable, and includes magnetic disks, magnetic tapes or cassettes, CD-ROMs, CD-RWs, DVDs, flash drives, or any other medium which can be used to store information and which can be accessed within the computing environment 200. The storage 240 stores instructions for the software, such as region of interest detection software 285 to implement methods of capturing building features using depth scans.

The input device(s) 250 may be a device that allows a user or another device to communicate with the computing environment 200, such as a touch input device such as a keyboard, a camera 252, a depth measurement system 254 such as a LIDAR system, a microphone, mouse, pen, or trackball, a scanning device, a touchscreen 256, or another device that provides input to the computing environment 200. For audio, the input device(s) 250 may be a sound card or similar device that accepts audio input in analog or digital form, or a CD-ROM reader that provides audio samples to the computing environment. The output device(s) 250 may be a touchscreen, display, printer, speaker, CD-writer, or another device that provides output from the computing environment 200. A Compass/Magnetometer 290 may be included which may allow the device to determine which direction pictures are taken with the 2D scanner 252 and Depth Sensor 254.

The communication connection(s) 270 enable communication over a communication medium to another computing entity. The communication medium conveys information such as computer-executable instructions, compressed graphics information, or other data in a modulated data signal. Communication connections 270 may comprise input/output devices 250, and input/output devices that allows a client device to communicate with another device over network 260. A communication device may include one or more wireless transceivers for performing wireless communication and/or one or more communication ports for performing wired communication. These connections may include network connections, which may be a wired or wireless network such as the Internet, an intranet, a LAN, a WAN, a cellular network or another type of network. It will be understood that network 260 may be a combination of multiple different kinds of wired or wireless networks. The network 260 may be a distributed network, with multiple computers, which might be building controllers acting in tandem. A computing connection 270 may be a portable communications device such as a wireless handheld device, a cell phone device, and so on.

Computer-readable media are any available non-transient tangible media that can be accessed within a computing environment. By way of example, and not limitation, with the computing environment 200, computer-readable media include memory 220, storage 240, communication media, and combinations of any of the above. Computer readable storage media 265 which may be used to store computer readable media comprises instructions 275 and data 280. Data Sources may be computing devices, such as general hardware platform servers configured to receive and transmit information over the communications connections 270.

The computing environment 200 may be an electrical controller that is directly connected to various resources, such as HVAC resources, and which has CPU 210, a GPU 215, Memory 220, input devices 250, communication connections 270, and/or other features shown in the computing environment 200. The computing environment 200 may be a series of distributed computers. These distributed computers may comprise a series of connected electrical controllers.

Although the operations of some of the disclosed methods are described in a particular, sequential order for convenient presentation, it should be understood that this manner of description encompasses rearrangement, unless a particular ordering is required by specific language set forth below. For example, operations described sequentially can be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "determine," "build," and "identify" to describe the disclosed technology. These terms are high-level abstractions of the actual operations that are performed. The actual operations that correspond to these terms will vary depending on the particular implementation and are readily discernible by one of ordinary skill in the art.

Further, data produced from any of the disclosed methods can be created, updated, or stored on tangible computer-readable media (e.g., tangible computer-readable media, such as one or more CDs, volatile memory components (such as DRAM or SRAM), or nonvolatile memory components (such as hard drives) using a variety of different data structures or formats. Such data can be created or updated at a local computer or over a network (e.g., by a server computer), or stored and accessed in a cloud computing environment.

II. Method Embodiment

Figure 3:
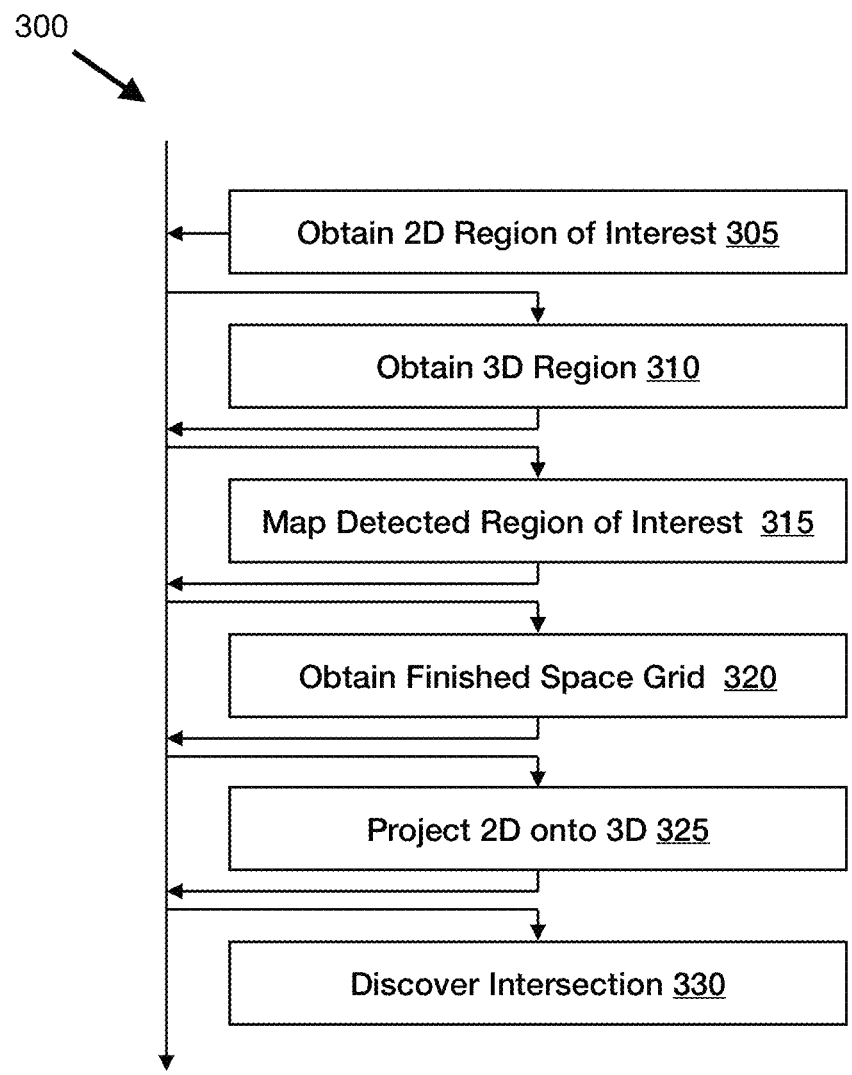
FIG. 3 is a flowchart that illustrates a method for capturing building features using 2D and 3D scans according to certain described embodiments.

With reference to FIG. 3, a flow chart 300 describes a method that may be used by the device in embodiments disclosed herein. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiment, method 300 may be implemented by a program 285 stored in a processor and memory element 230, in one or more processing devices (e.g., a digital processor, an analog processor, a microprocessing unit, a digital circuit designed to process information, and/or mechanisms for electronically processing information), such as in the core processing element, which includes a central processing unit 210 and memory element 220. The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300. Operation 305 discloses obtaining a region of interest using a camera attached to a device, the device having a processor, memory, input/output device and a depth sensor; the camera defining distances from the camera sensor to respective points in the space using a two dimensional grid.

The region of interest may be obtained using image recognition software. This image recognition software may be machine learning software, artificial reality software, a combination of both, something else, etc. The software may be associated with the camera input. Image recognition software may not seem like a good fit for scanning. Traditional augmented reality uses the parallax of a camera and feed to construct an understanding of the world immediately in front of the camera. But this is only a local understanding, when moving to a new point there may be little correspondence between the world constructed at that specific point, and any previously recorded. This is a problem faced by anyone using AR or LIDAR to scan, or represent the real world. A camera may be able to track features immediately in view, but it is unclear how to piece locally correct measurements into a global consistent map. When LiDAR is used to create a 3D view, for example, it constantly adjusts its understanding of the world as a map continues to be created based on new inputs from its sensors. As a consequence, previously valid positions can become invalid, especially when moving around spaces. This causes objects placed in the three dimensional capture to drift around the three dimensional grid as more information is added, especially when the object is out of the current 3D capture view. Annotations are create with this reality in mind. They defer to the 3D mesh as the source of truth, as the 3D mesh is robust to updates in coordinates. An annotation indicates only a general area of the mesh, which is refined when the entire geometry is finalized.

Figure 4A:
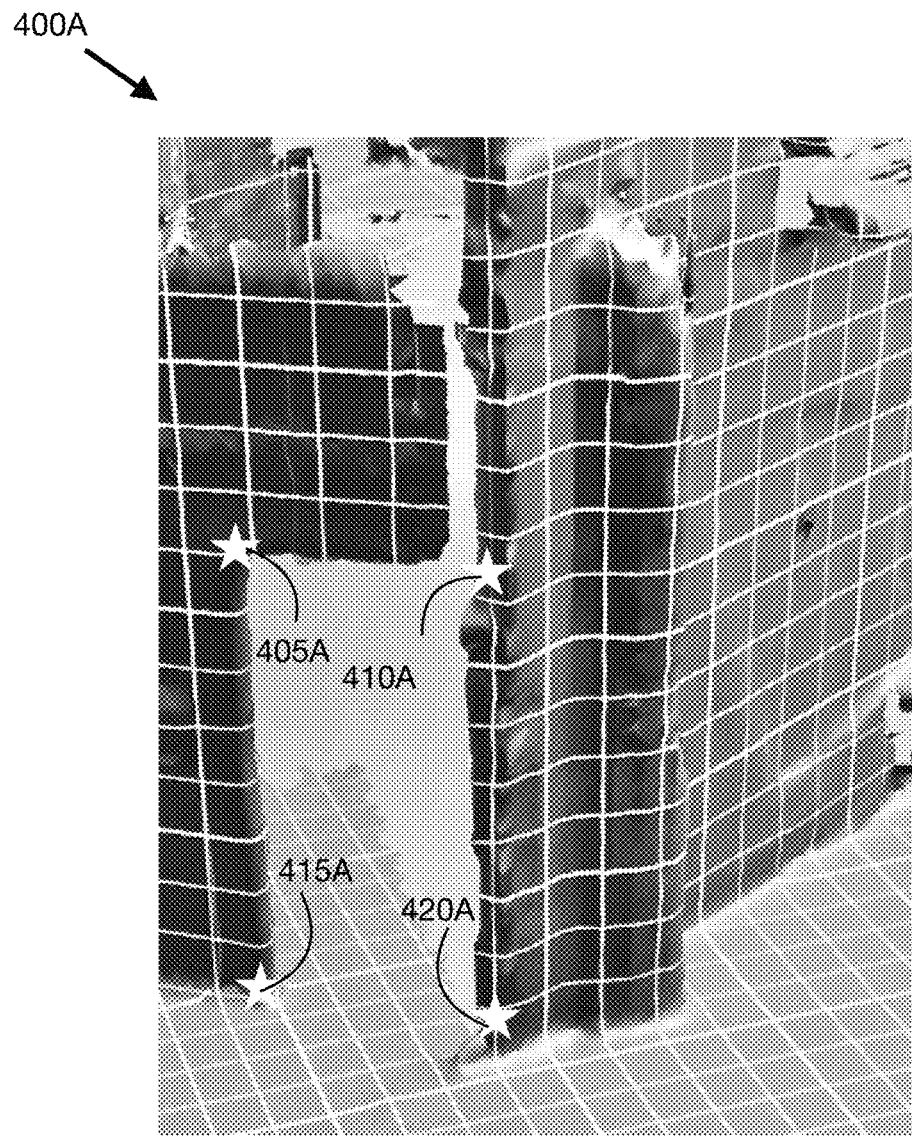
FIG. 4A discloses a picture 400A of an exemplary region of interest that may be detected by a machine learning algorithm using the input from the camera system according to certain described embodiments.

To capture a space, in some embodiments, a user walks around pointing a device with both a camera and a depth scanner (e.g., FIG. 2) at areas within the space, from multiple perspectives. The two dimensional capture presents a representation of the 3D depth geometry, using a transformation of two dimensions of the three dimensional grid. The transformation may be provided by software associated with the camera, the depth scanner, or both. This scan includes relevant reading from sensors including orientation and compass direction. Figures of interest, such as windows, vents, doors, etc. have distinct shape recognizable with recognition software. Recognition software, which may comprise one or more machine learning algorithms, etc., may be able to use the two dimensional capture to determine an exemplary region of interest. FIG. 4A discloses a picture 400A of an exemplary region of interest that may be detected by a machine learning algorithm using the input from the 2D camera system. For example, a door may be detected. This detection may comprise detecting at least three points of interest that correspond to object corners. In the example shown, four points 405A, 410A, 415A and 420A are detected that correspond to the door corners. These points 405A to 420A are detected in two dimensions to mark the door location.

At operation 310, a plurality of depth measurements captured by the depth sensor are obtained. These depth measurements may be obtained from a program that is associated with the depth measurement capture. The depth measurements define distances from the depth sensor to respective points in the space using a three dimensional grid.

Figure 4B:
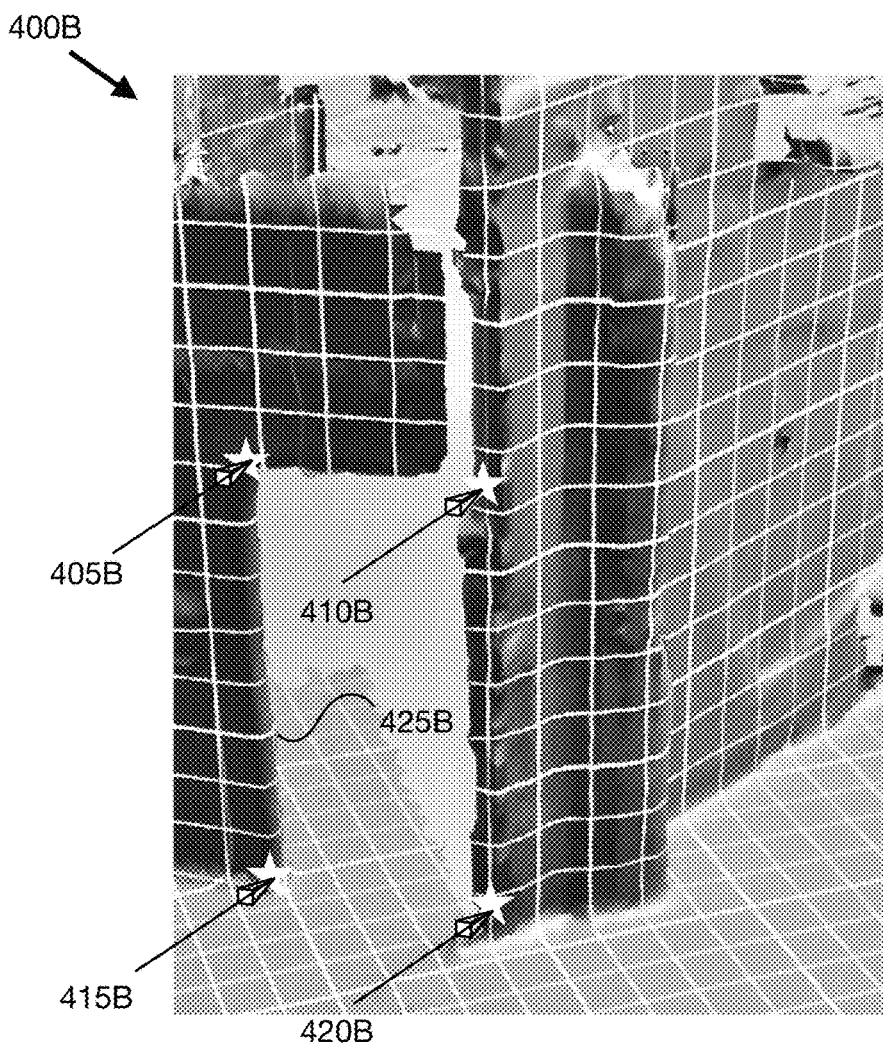
FIG. 4B discloses the region of interest shown in FIG. 4A with the two dimensional annotations replaced with three dimensional rays according to certain described embodiments.

At operation 315, the detected region of interest (which is in two dimensions) is mapped onto the three dimensional grid to make a three dimensional ray. These two dimensions may be detected in a two dimensional grid which may then be transformed into the three dimensional mesh grid locations using software available with the 3D mesh system, the 2D camera system, some combination, etc. For the detected points, the two dimensions are then transformed into a ray with a third dimension tail that intersects the three dimensional shape that the region of interest is attached to. Within a virtual 3D scene, it is known by those of skill in the art, methods and systems to cast a ray out into the 3D world in a way that agrees with the 2D and the 3D optics. In some embodiments, the intersection may be at 90°. Other embodiments may have intersections at different degrees, may not specify a degree, may allow degrees within a certain percentage, and so on. The ray is then followed to see where it hits a mesh within the 3D world. That is the point of the ray, giving a 3D point. An example of this can be seen with relation to FIG. 4B. FIG. 4B at 400B discloses the region of interest shown in FIG. 4A with the two dimensional annotations replaced with three dimensional rays associated with the three dimensional grid, with the rays intercepting the object detected by the 3D system at roughly 90°. As the 3D capture system captures more of the space, the individual three dimensional points may be adjusted by the 3D capture system. As the rays (e.g., 405B, 410B, 415B, 420B) are associated with the three dimensional system, they will move with the system as it is modified.

Figure 5A:
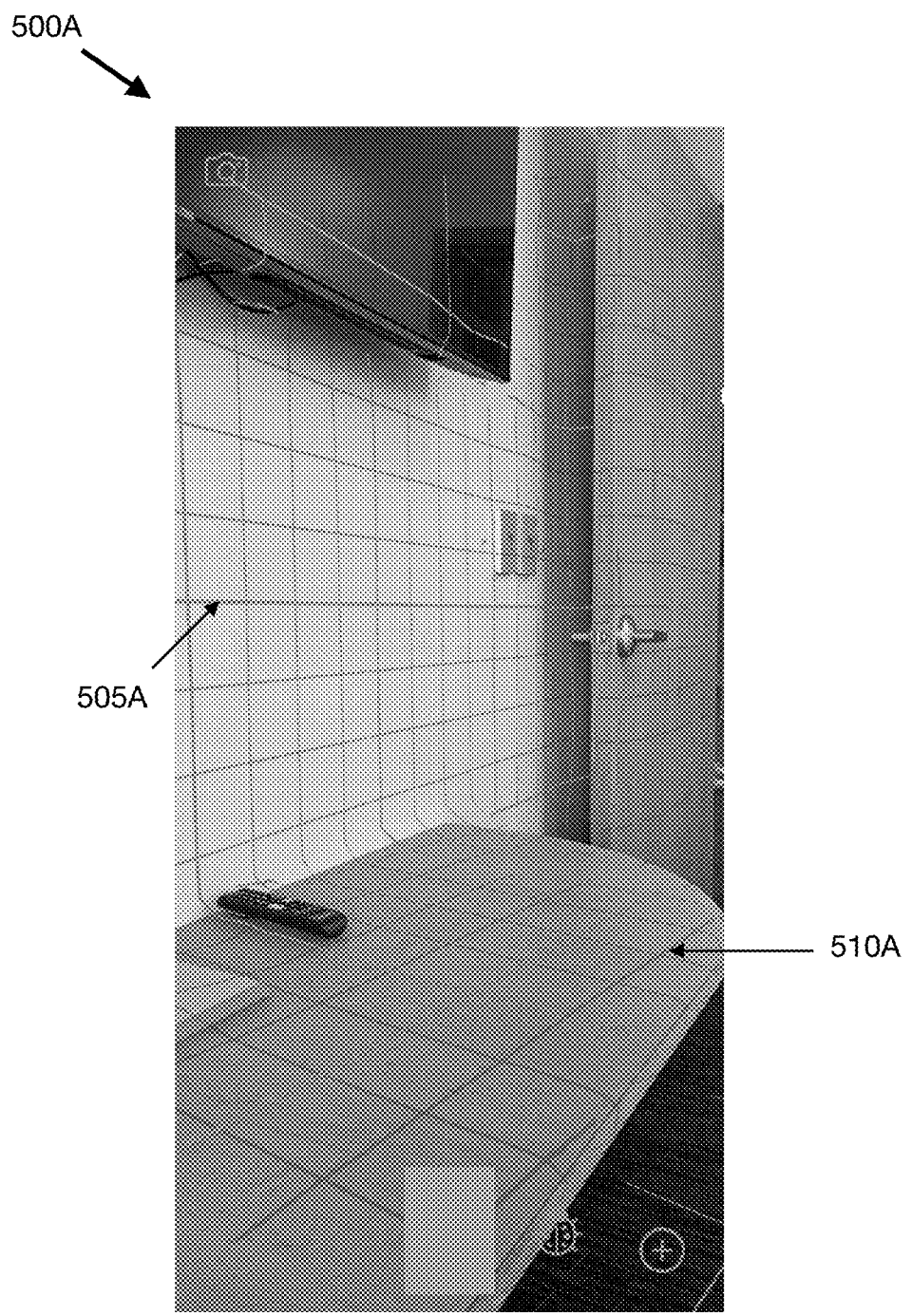
FIGS. 5A-5D are a picture of an exemplary touch-sensitive surface according to certain described embodiments.
Figure 5B:
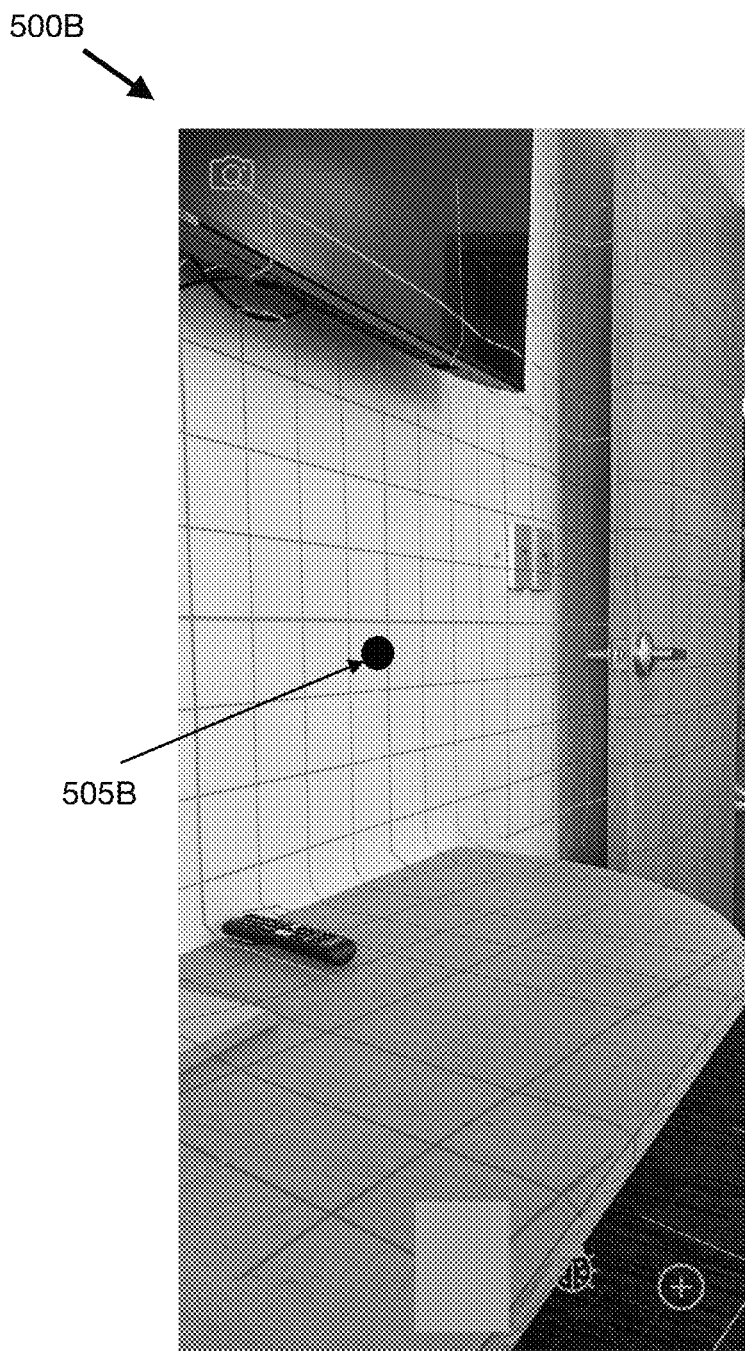
Figure 5C:
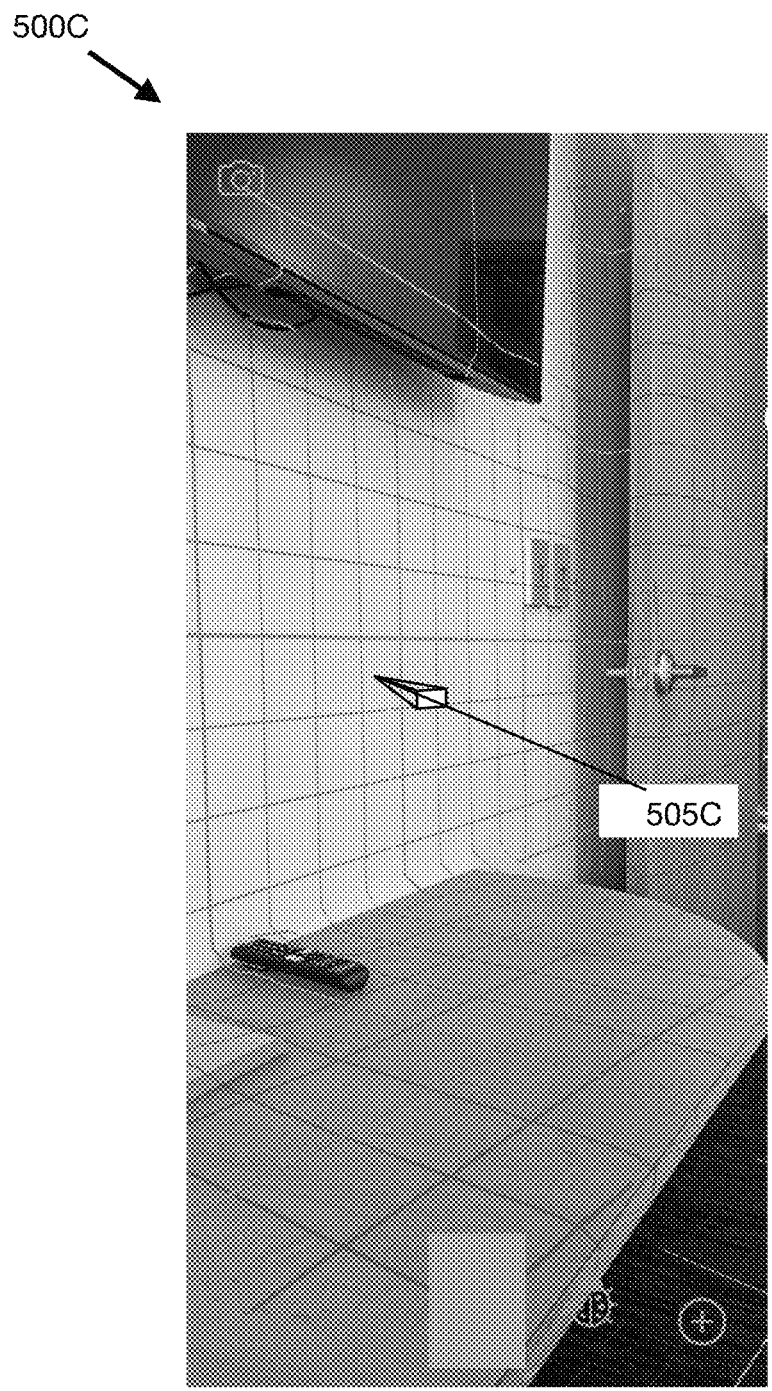
Figure 5D:
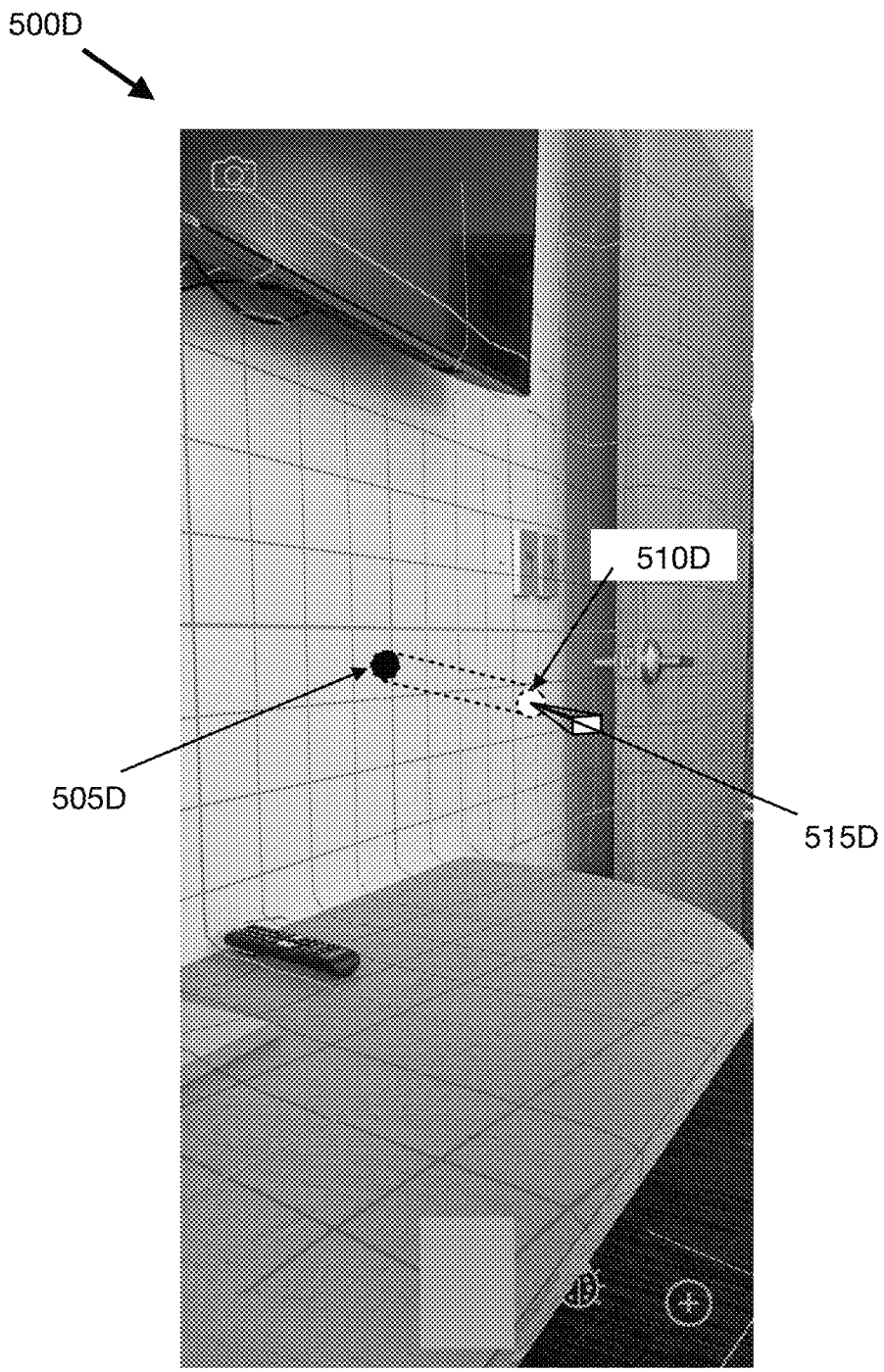

In some embodiments, an annotation to mark a specific feature is placed on the surface (a two dimensional representation) of a representation of the three dimensional depth view, which may be further specified with grid lines. FIG. 5A is a picture 500A of an exemplary touch-sensitive surface showing a two dimensional view of a three dimensional depth view complete with grid lines 505A, 510A representing the three dimensional depth view. This three dimensional view should be thought of as a picture that is generated when a scan of the space is in progress, such as when this view is generated, not the finished image. FIG. 5B is a picture 500B of the exemplary touchscreen with an annotation 505B placed by a user in two dimensions—the two dimensions of the touchscreen. This annotation is placed to define a wall. Although this embodiment is discussed with reference to a touchscreen, it should be understood that input can be provided using a computer monitor that displays the two dimensional version of the three dimensional view, with input provided by a mouse-click while the mouse pointer is located over the annotation location, or other input methods known by those of skill in the art. These annotations are saved. The annotations may be saved as a ray with the two known dimensions from the two dimensional view translated into the two location dimensions in the 3D coordinate system with a third dimension (within the 3D view) that represents a line that points into the annotation. FIG. 5C at 500C discloses a ray 505C that is created from the annotation 505B and then saved within the 3D coordinate system. FIG. 5D at 500D discloses an exemplary three dimensional coordinate system that has moved as an entire scan has been made. The original annotation point 505D has moved to the location represented by 510D. As the ray that represents the annotation is saved with the three dimensional coordinate system, as the coordinates shift position, the ray will shift position with the other coordinates, leaving the ray at the end of the scan in position 515D.

At operation 320 a finished depth measurement three dimensional grid of the space is obtained. Once a user has finished scanning, then this step can take place. This grid may be obtained from depth measurement software associated with the depth measurement device. For example, the Apple iPhone with LiDAR has various applications that can provide such information. The finished depth measurement three dimensional grid may be subtly different than the original grid as generated initially by the individual snapshot in time, when the specific annotation was produced, as the reconstruction software may constantly adjust its understanding of the world in later snapshots based on new input from its sensors. As a consequence, a previous annotation location (e.g., 405, 505B) may have changed location. An example of this may be seen in FIG. 5D. The original annotation location 505C has moved to the position 510D after the entire space has been scanned and the walls, etc., have been adjusted. The ray 505C, 515D originally at position 505B, 505D has now moved to position 510D.

Figure 6:
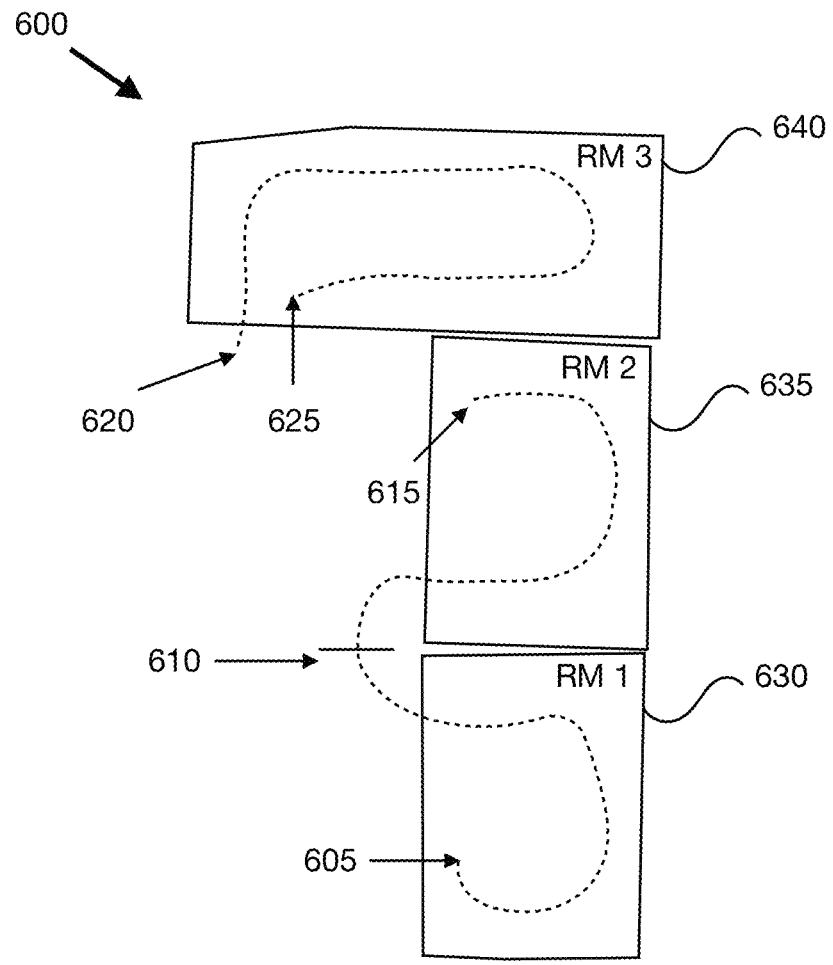
FIG. 6 depicts a multi-room scan session according to certain described embodiments.

FIG. 6 depicts a multi-room scan session 600 with three rooms, RM1 630, RM2 635, and RM3 640. This is a top down view with the dotted line depicting the route a user walked when performing the scan. A user may start at one point 605 of a room 630, and continue to the end 610 of the room 630. When one area is finished, it may be explicitly saved, eg., at 610. However, the scanning session may remain uninterrupted so a user can scan additional rooms, e.g., RM2 635 and RM3 640 while preserving the initial coordinate system. As such, a user can scan RM2 635 following the path between 610 and 615. Assuming there is a save at 615, a break, e.g., the difference between positions 615 and 620, can be correctly oriented using the compass/magnometer 290. However, some stitching together of the different scans may need to be performed manually. Scans may be separated into discrete areas. This may be done for logical organization reasons, as well as to handle resource limitations such as memory, rendering, storage, etc. Once a scan is captured, in some embodiments, some combination of conversion, compression (e.g., gzip, zip, or other compressor known by those of skill in the art), and/or optimization may be performed to make the transformed scan more suitable for long term storage. In some embodiments, the three dimensional mesh from the scan (which may be a LiDAR mesh) may be divided into chunks. In some embodiments, other methods may be used, such as dividing the three dimensional mesh into different data structures, etc. When chunks are used, the chunks may be of an appropriate size for the system that is being worked on, the equipment used, etc. In some instances, this may be a meter$^3$ volume that fit together seamlessly. In some embodiments the chunks may be of equal size, in some embodiments, the chunks may be of different sizes, etc. The data may be stored in the same coordinate system as the original capture, for accuracy and consistency. Every time a floating point operation is performed, as opposed to an integer operation, precision is lost. As a 3D mesh has many points, the points with subtle measurement differences, it is of benefit to perform as few floating point operations as possible, both to speed up computing time and to prevent losing accuracy within the 3D mesh. In embodiments discussed herein, the floating points are determined on the original data a single time, when they are first entered into the 3D mesh. Other movements, such as assembling a floor plan, just reference the original source and transform it, rather than modifying the underlying floating point number. In some embodiments, the 3D data is more detailed than necessary. In such cases, a simplification step may be used to reduce the number of vertices and faces without losing shape definition. This may reduce storage requirements and the amount of data to process. Simplification algorithms are known by those of skill in the art.

Figure 4C:
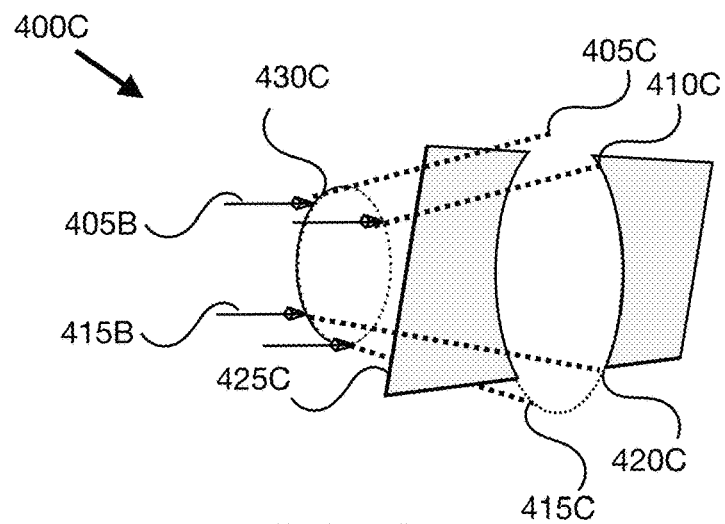
FIG. 4C discloses the region of interest shown in FIG. 4A with a cone projecting through a wall according to certain described embodiments.

At operation 325, the two dimensional detected region of interest is projected onto the finished depth measurement grid of the space to make a projected three dimensional shape. FIG. 4C at 400C discloses the region of interest shown in FIG. 4A with a cone projecting through a region of interest, in this case, a wall. Once the 3D scan is finished and the rays have moved according to the movement of the underlying 3D grid, the region of interest may need to be relocated. In some embodiments, the region of interest ray locations 405B to 420B (shown here without any underlying movement) are used to define a circle 430C which is then used to define a partial cone that is projected into the 3D grid. Three points may be used, four points may be used, creating a frustum that will be used for the intersection etc. When a region of interest that comprises a void (such as a window or a doorway) is being searched for, a (mostly) flat surface 425C orthogonal to the rays 4105B-420B (e.g., a wall such as 425B) is searched for. The surface does not have to be totally flat. Some embodiments may also incorporate methods and systems described with relation to the section "Floor Plan Extraction."

At operation 330, discovering the intersection between the projected three dimensional shape and the finished depth measurement three dimensional grid of the space is discovered, and is marked as a region of interest. The intersection between the wall location and the rays projection along the cone 405C, 410C, 415C, 420C then becomes the new corners of the region of interest. This new region of interest may then become more defined by connecting the points, by using the method described with relation to FIGS. 8A to 8F, or a different method may be used.

Figure 7A:
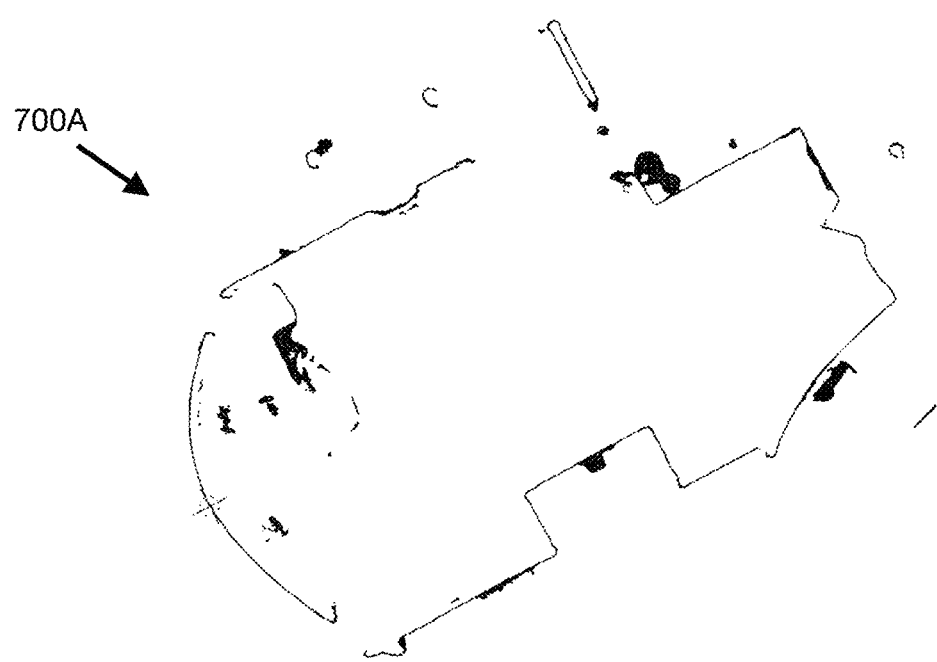
FIG. 7A discloses a slice of a 3D mesh scan according to certain described embodiments.
Figure 7B:
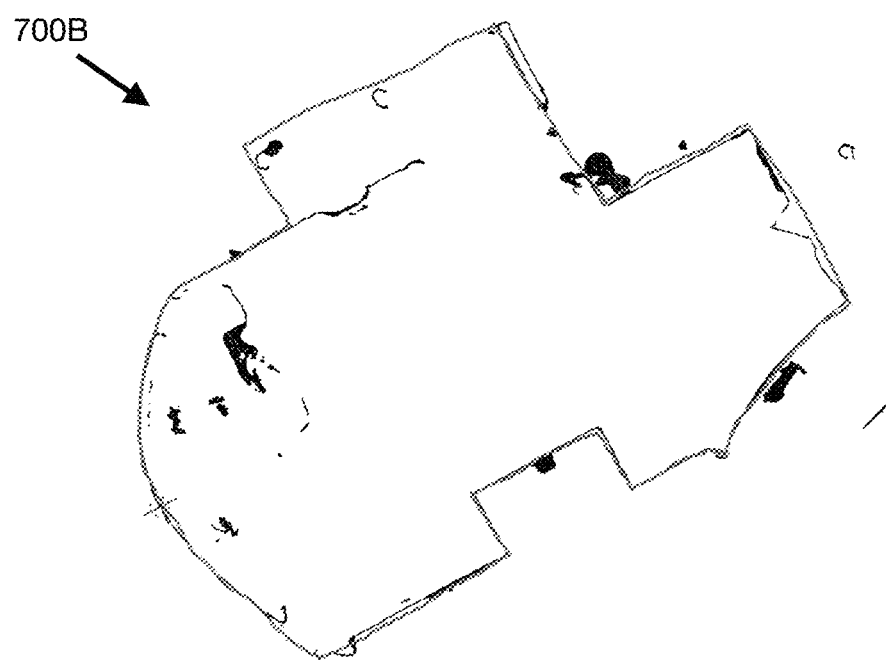

The concept of a floor plan seems intuitive, but it is difficult to define rigorously. For example, a definition such as "walkable area with all furniture is removed" is insufficient because structures that are not a portion of the floor plan, such as cabinets, fireplaces, steps, etc would all be included. FIG. 7A at 700A discloses a slice of a 3D mesh scan. In this slice, one can probably deduce which lines make up the floor plan, but to do so, the brain ignores superfluous information and inserts missing details. Furthermore, the decision of what the floor plan is is not based on geometry alone; rather, it includes implicit understanding of the idea of the space and what a person deems important at the time, for example, whether adjacent areas are considered separate rooms or not may require human input. Floor plan definition is often in terms of use, or aesthetic, rather than geometry. With reference to FIG. 7B, a user could probably draw the floor plan 700B, but it is very difficult for a machine. To do so, user annotations and contextual analysis may be used to fill in the missing gaps. To identify walls, a user may place markers on each wall, as shown with reference to FIG. 5B.

Figure 8A:
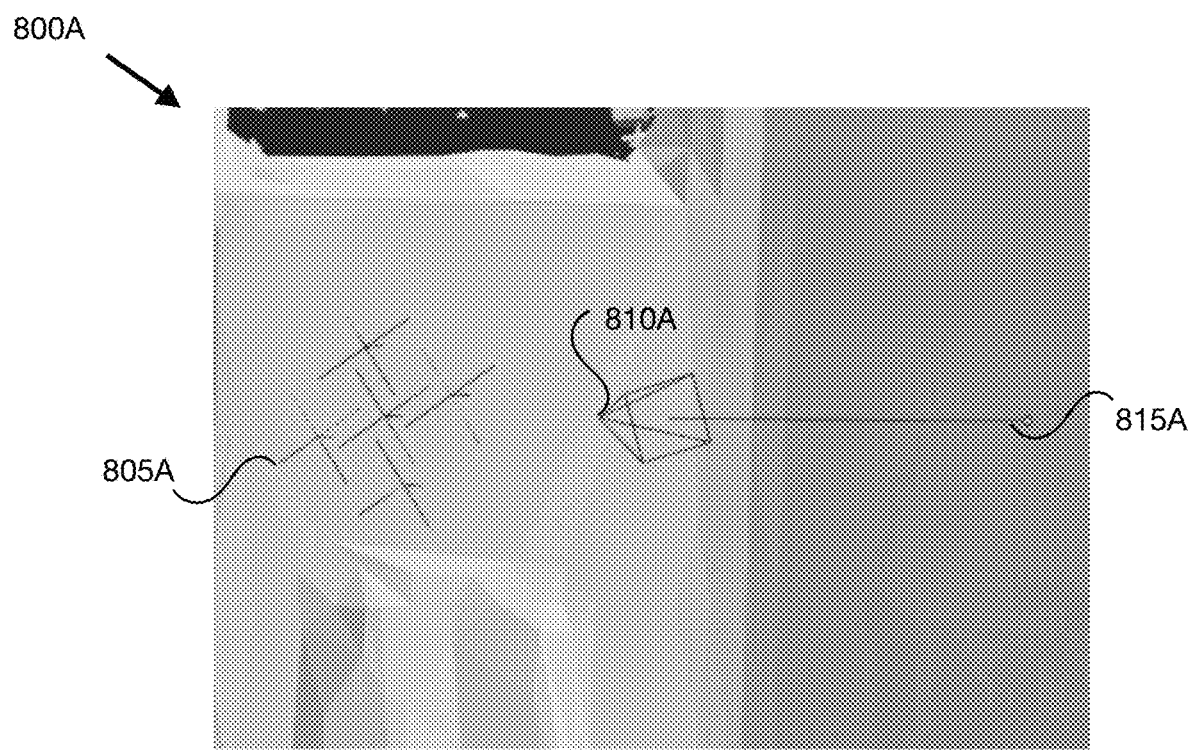
FIGS. 8A and 8B disclose rays being cast from an original ray location within a 3D model according to certain described embodiments.
Figure 8B:
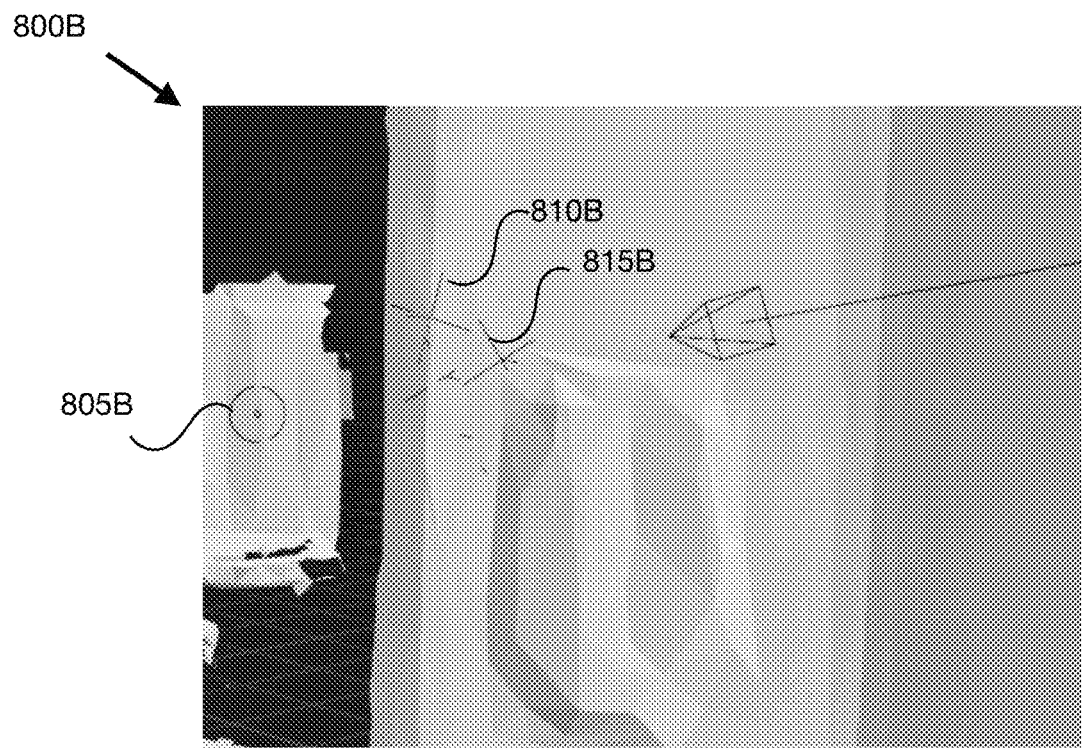
Figure 8C:
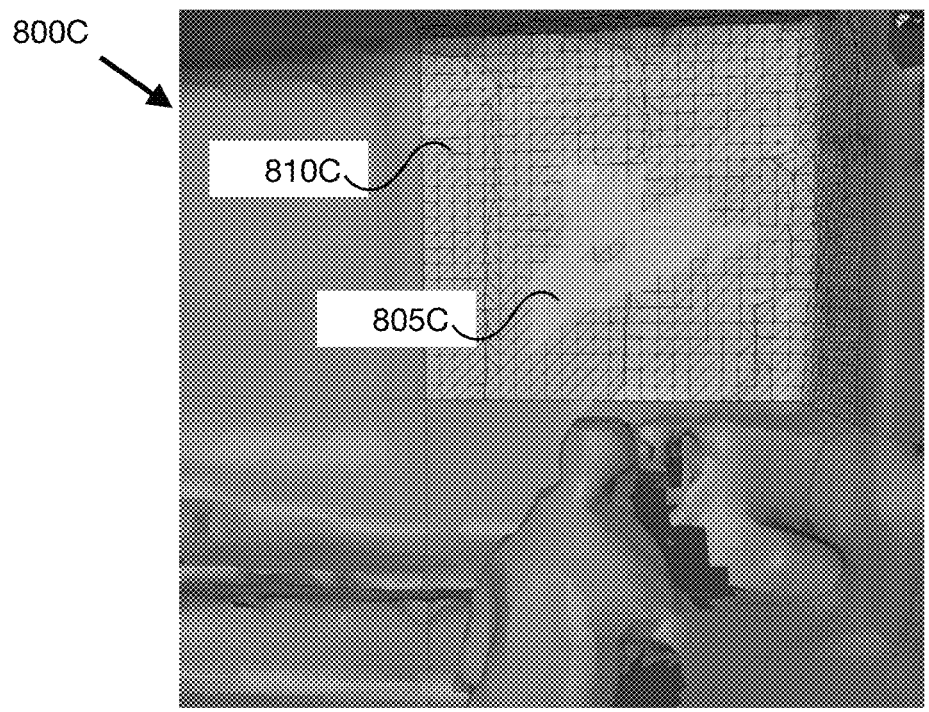
FIG. 8C discloses a portion of a wall where marker orientations have been discovered to be oriented the same way in an initial ray casting according to certain described embodiments.
Figure 8D:
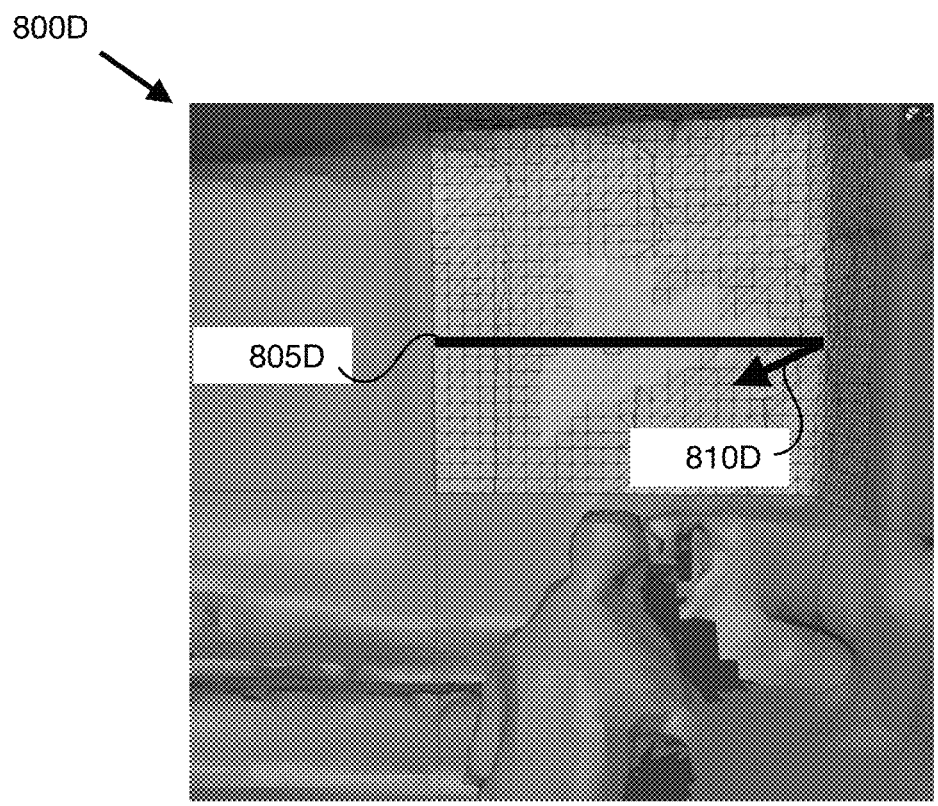
FIG. 8D discloses a flattened two-dimensional marker according to certain described embodiments.

FIGS. 8A at 800A and 8B at 800B disclose rays being cast from an original ray location within a 3D model. In post process after the scan of a space is completed, rays 805A offset by a small amount are cast from the original marker location 810A into the 3D model. In some embodiments, the tail of the ray 815A points in the direction that the scan was made. These ray locations 805A act as samples to determine the orientation and position of a region of wall. Where most of their face orientation agrees, a wall portion is determined to exist. When face orientation does not match, as shown with regard to 805B, 810B and 815B, those rays are rejected. FIG. 8C at 800C discloses a portion of a wall where marker orientations have been discovered to be oriented the same way 805C in an initial ray casting. In some embodiments, the grid orientation is checked for a wider area to discover a larger patch of wall, as shown at 810C. As shown with reference to FIG. 8D at 800D, the discovered patch is flattened into a two-dimensional marker 805D that is perpendicular with a presumed floor orientation. This presumed floor orientation may be a z axis. The marker not only gives a position, but also a surface normal 810D from which an orientation is derived. This may also tell us which side is inside and which is outside.

Figure 8E:
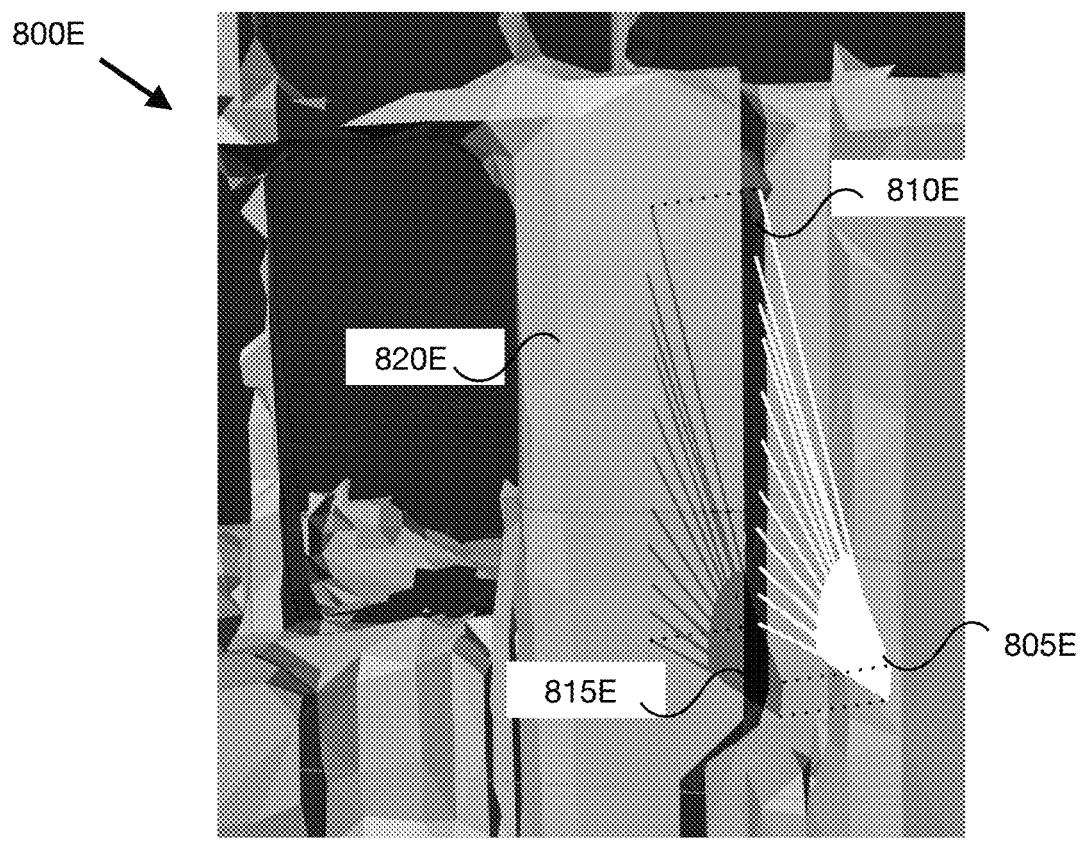
FIG. 8E discloses a portion of a wall showing rays adjusted when the originally placed ray location is not correct due to drift.

FIG. 8E discloses a portion of a wall 800E showing rays adjusted when the originally placed ray location 805E is not correct due to drift. The ray position here falls into a crack in the 3D scan 810E. It is assumed that even if the originally placed location is not correct due to drift, as in the current case, the orientation (surface normal) should be. Therefore, a location near the original ray cast which can be well represented by the plane and also matches the orientation, e is determined. Shifting the original ray over a bit 815E, shown in gray, now strikes the intended surface 820E. This may be thought of as a constrained optimization problem, with the variable being the annotation position. Fitting a plane to the intersection points may be solved using regression, such as singular value decomposition. In some embodiments, the acceptable region to search may be a small cube, circle, etc., around the annotation position.

Figure 8F:
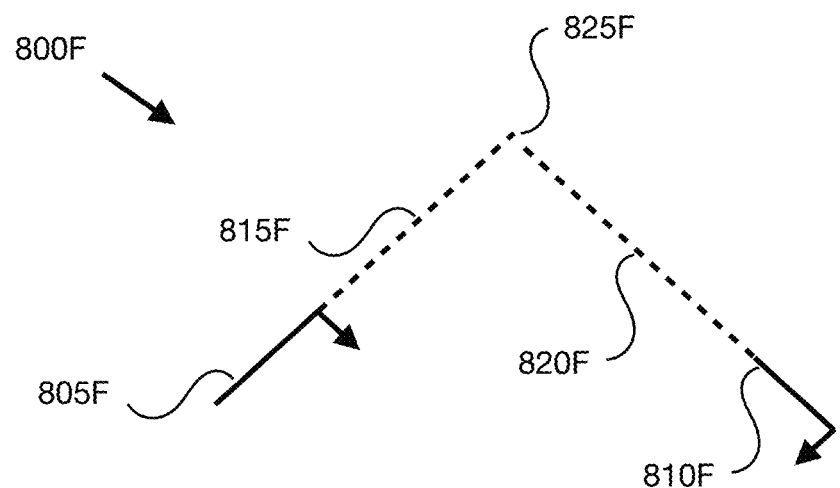
FIG. 8F discloses an exemplary way to connect markers according to certain described embodiments.

FIGS. 8F at 800F and 8H at 800H disclose an exemplary way to connect markers. One marker 805F discovered within the 3D mesh finds a neighbor 810F, whose normal 835F is oriented into the inside of a space that the normal 830F of the marker 805F is also oriented inside of. The two are then extended 815F, 820F, creating 3D intersections, until they touch 825F, forming a corner. Because the orientation and compass readings of the 3D mesh is known, the portion of a wall that is being constructed can be construed. This helps determine the direction that an edge should be extended. The edges are pieced together, neighbor by neighbor, using features such as compass orientation, etc., until an outline of a room 800H is constructed. These outlines may be called closed paths composed of edges.

Figure 8G:
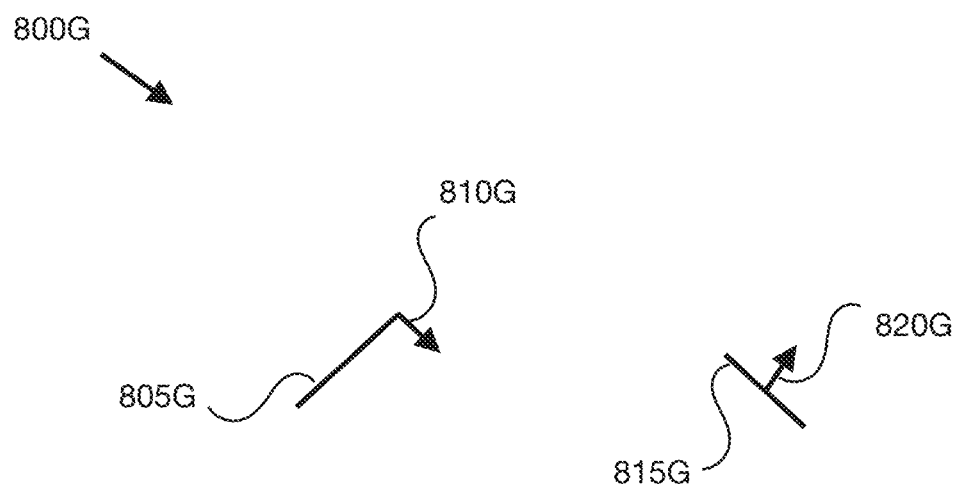
FIG. 8G discloses an exemplary set of markers that should not be connected according to certain described embodiments.
Figure 8H:
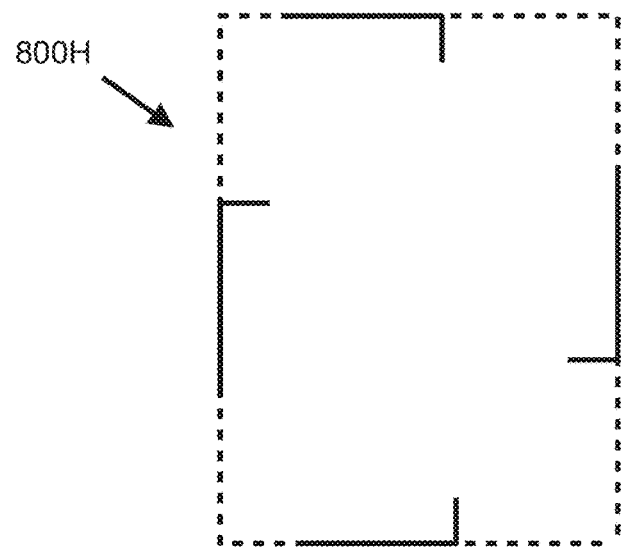
FIG. 8H discloses an outline of a room that may be constructed according to certain described embodiments.

FIG. 8G at 800G discloses two markers 805G and 815G that do not have their normals 810G, 820G pointing to the inside of the same space. The wall represented by the marker 815G has its inside in a different orientation that of the marker 805G, as represented by the different ways their normals 810G, 820G are pointed. They are not pointed toward the same space. These two markers should not be connected as shown with reference to FIG. 8F, as they are directed to different rooms, or room-like spaces.

Figure 9:
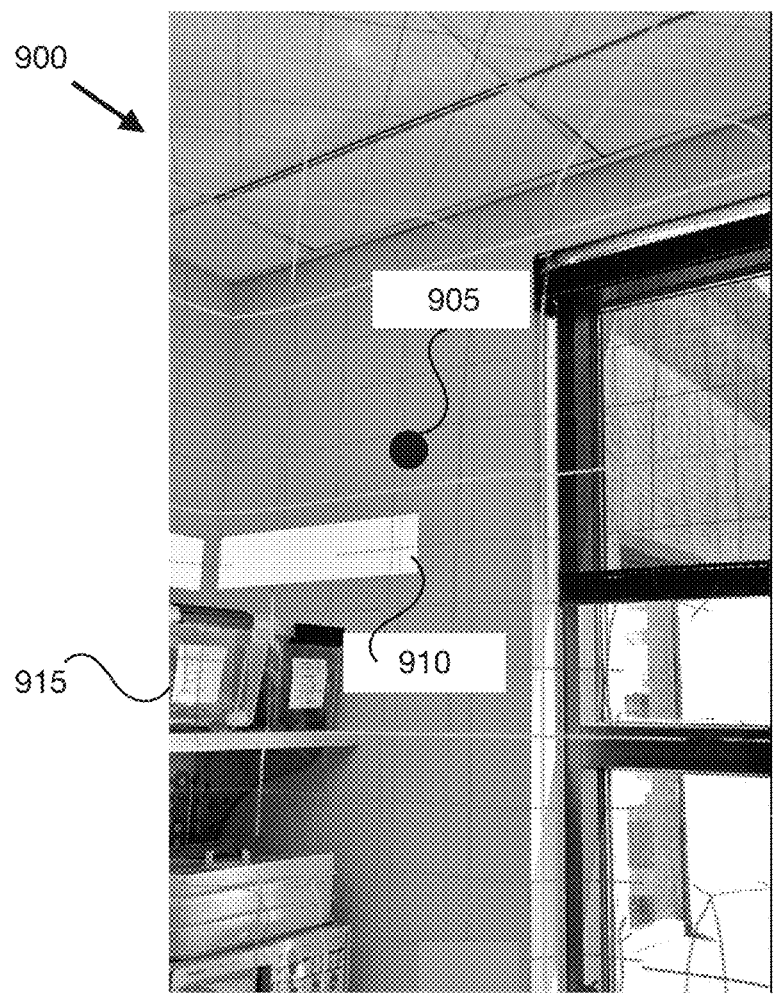
FIG. 9 discloses a marker that may be placed on a screen to mark a wall when an annotation is placed according to certain described embodiments.

FIG. 9 at 900 discloses a marker 910 that may be placed on a screen to mark a wall when an annotation is placed. When scanning a space such as a room, there may be structures, such as shelving with storage 915, equipment such as microwaves, etc. that are in front of a wall and may occlude a scanner properly measuring the wall depth. When there is a space where the wall can be seen, an annotation 905 may be placed within a 2-D representation, such as a phone screen, which marks the wall depth. In some embodiments, a marker 910, such as a rectangle, that shows the portion of the wall that has been defined, may be shown on the 2D representation. This may be a preview of the floor plan closed path, so it may show both connectivity (which annotations are neighbors) and shape. This gives us a "mini map" which shows a top down preview of what floor plans we have found up to this point. An example is shown with reference to FIG. 7A.

IV. System Embodiment

Figure 10:
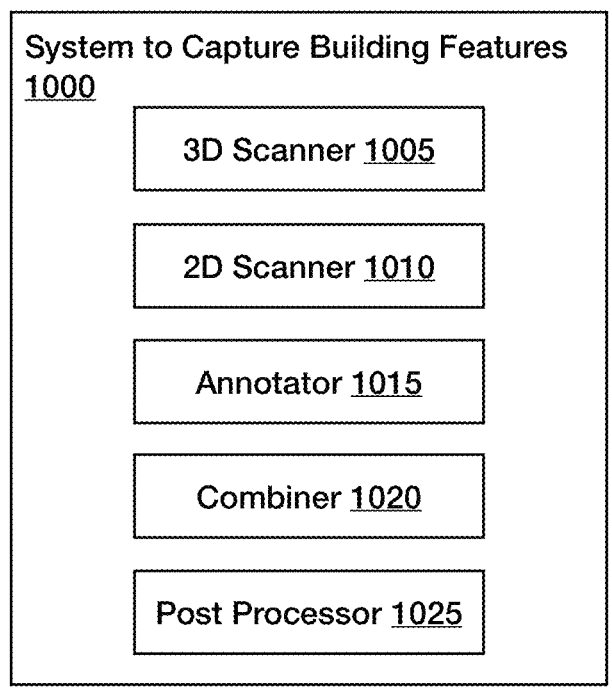
FIG. 10 is a functional block diagram showing an exemplary system to capture building features using 2D and 3D scans according to certain described embodiments.

Turning now to FIG. 10, FIG. 10 depicts one topology for capturing building features using 2D and 3D scans. Topology 1000 may include one or more central processing units 210, memory 220, and communication connections 270. Storage 240 may comprise one or more computer readable storage media. The computing environment may be portable, such as found within a personal electronic device.

The system 1000 includes a 3D scanner 1005 that is operationally able to scan a space in three dimensions. A 2D scanner, such as a camera, 1010 is operationally connected to the 3D scanner. As such, the 2D scanner may be able to scan the same space as the 3D scanner at the same time. The 2D scan and the 3D scan may be able to share (2D) locations using transformations of the 2D or 3D mesh that is created by the scan. These transformations may be provided by software associated with the device that holds the 2D scanner 1010 and 3D scanner 1005. The 2D scanner is operationally able to use machine learning or other techniques to detect regions of interest in two dimensions. Regions of interest may be building features, such as walls, windows, doors, etc. They may also be moveable objects such as equipment, shelving, furniture, etc. A combiner may be able to combine the 2D scan locations of the features of interest into comparable locations within the 3D scan. The combiner may also operationally be able to mark features of interest in a 2D scan using two of the three dimensions from the 3D scanner. These markings may be rays that have two dimensions that are the captured 2D dimensions. The 2D dimensions may then be transformed into their equivalent locations within the 3D grid. The combiner may be able to transform these 2D dimensions along with orientation shared by both the 2D scanner and the 3D scanner into a ray. The tail of the ray may be a z axis that points into the location on the scan, where "into" is a relative dimension that represents the way the 2D scanner 1005 and the 2D scanner 1010 was pointing when the scan was made. A combiner 1020 combines the regions of interest discovered using the 2D scanner.

Figure 11:
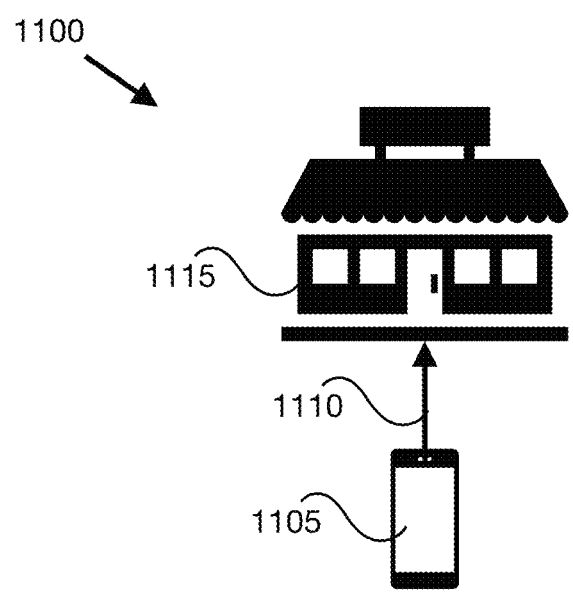
FIG. 11 is a diagram showing an exemplary z axis in a scan according to certain described embodiments.

FIG. 11 at 1100 discloses a scanner 1105 pointing towards a scene 1115 (e.g., a building front) that is being scanned. The line at which the scan is being made 1100 may be considered a third dimension axis, as it is the axis that a 2D scanner 1010 lacks. This may also be referred to as the z axis. This z axis may be able to be determined by the coordinate system of the scan made by the 3D scanner. It may then be used to create the ray tail. These markings may be created while the scan in being made, and may require 2D grid coordinates to be translated into the appropriate 3D grid coordinates. The 2D grid coordinates may be created by the 2D scanner, the 3D scanner, or the 2D and 3D scanners working together. In some embodiments, the 2D coordinates may be transformed into the 3D coordinates using software, firmware, and/or hardware associate with the device which comprises the scanners. An annotator 1015 may also be included that is operationally able to transform those 2D markings of regions of interest into rays within the 3D space that intersect a mass within a 3D depth mesh of the space. The mass may be a wall, or other large feature. The mass may be a much smaller feature, such as a piece of equipment, a sensor, etc. While a scan is being made, the 3D grid may be adjusted according to new information that is discovered by the 3D scanner during the scan creation process. As such, the 3D locations in the 3D mesh may have moved position from their original positions. Once a whole space has been scanned, e.g., when the scan is finished, a post processor 1025 that operates on the whole 3D scan may operationally be able to use the original 2D positions that were transformed into equivalent locations within the 3D scan to create a 3D scan of a space with the regions of interest marked. As a 3D scan is being created, the underlying 3D mesh may change position, changing the positions of the marked regions of interest. Because the region of interest noticed in the 2D scan is marked within the 3D scan, as the 3D scan shifts because new information is incorporated, the region of interest marks move with them. At post-processing, the marked regions are looked at again, and reoriented with the regions of interest. An embodiment of how to do so is shown with reference to FIGS. 8A-8F and the surrounding text.

V. Computer Readable Medium Embodiment

Figure 12:
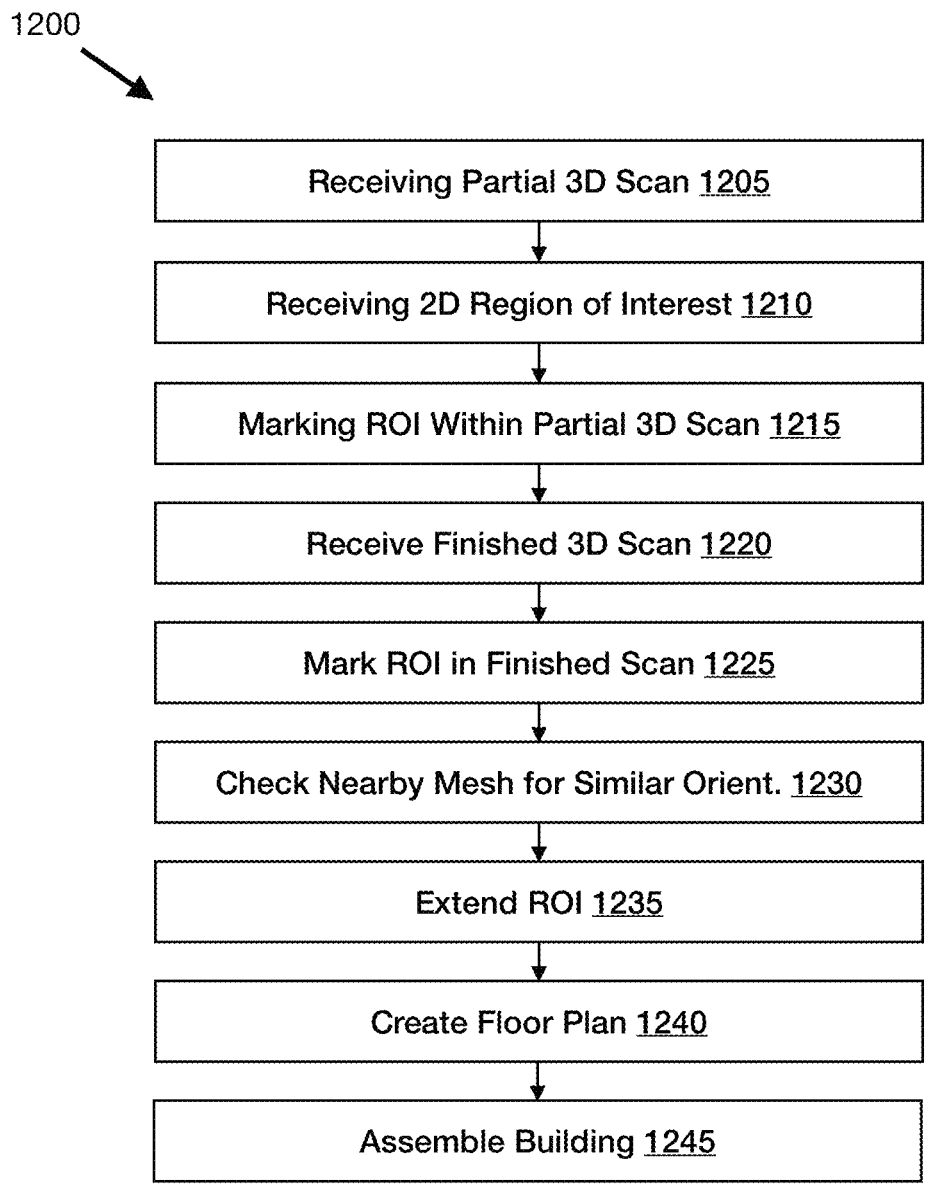
FIG. 12 is a flowchart that illustrates a method for capturing building features using 2D and 3D scans according to certain described embodiments.

With reference to FIG. 12, a flow chart 1200 describes a method that may be used by the device in embodiments disclosed herein. The operations of method 1200 presented below are intended to be illustrative. In some embodiments, method 1200 may be accomplished with one or more additional operations not described, and/or without one or more of the operations discussed. Additionally, the order in which the operations of method 1200 are illustrated in FIG. 12 and described below is not intended to be limiting.

In some embodiments, method 1200 may be stored in a non-transitory computer readable storage medium which may store instructions for performing capture of regions of interest. When the instructions are executed by a processor, e.g., 210, or something similar, it may cause the processor to perform the operations of method 1200.

At operation 1205, a 3D partial scan of a space is received. This scan may be originally created by a LiDAR instrument mounted on a device. At operation 1210, a 2D region of interest may be received. a 2D region of interest may be a feature such as a wall, a door, a window, a bookcase, a desk, a light fixture, a table, a sensor, a vehicle, a person, a plant, etc. This 2D region of interest may be generated by a 2D camera which is mounted on the same device that holds the LiDAR instrument. A common device that might hold both a 3D sensor and a 2D sensor is a personal handheld computer. A 2D sensor and a 3D sensor on the same device may also work in tandem, and as such, have an interface between the two. This may allow a 2D location within a scanned 2D mesh to be placed within the appropriate location within a tandemly-scanned 3D mesh that has been partially finished—a partial 3D scan. A 2D location may be turned into a 3D ray using transformations between the 2D and the 3D meshes, when the mesh is still only partially finished. Some examples of this are shown with reference to FIGS. 5A-5D and the surrounding text.

At operation 1210, a 2D region of interest (ROI) is received. when a scan is partially finished. This ROI may be received when the 2D scan encounters it. In some embodiments this region of interest may be received from a machine learning recognition system using a camera feed from the 2D camera mounted on the device. In some embodiments, other recognition systems may be used. Machine learning recognition systems are understood by people of skill in the art. An example of this can be found at FIGS. 4A-B at 400A and 400B. In some embodiments, this may comprise a user marking a region of interest on a screen that displays a portion of a space with a 3D scan overlaid on top. An example of this can be found at FIGS. 5A-B at 500A and 500B.

At operation 1215, the ROI is marked within the 3D scan, still while the scan is only partially finished. The location (or locations) of the ROI within the 2D scan may be transformed into coordinates within the 3D scan. The coordinates may then be turned into a ray, with the tail pointing at a large surface within the 3D scan. This ray tail may be able to be deduced using software associated with the 2D camera, the 3D scanner, both, or a different method. The ray may be called a 2D marked ROI. An example of this can be found at FIGS. 4A-B at 400A and 400B. Once the scan is finished, the locations marked in the 3D scan may have shifted as the scan continued, gaining more information.

During a post processing phase, the originally marked ROI locations are relocated within the new scan. At operation 1220, a finished 3D scan is received. This may be received by the LiDAR instrument, or by a system connected to the LiDAR instrument that can feed 3D scans into a processor associated with the device. The 3D scan may 3D data, any sensor history (such as camera information), and any annotations that have been placed. It may be able to be transformed into a 3D mesh. At operation 1225, the 2D marked ROI is intersected with the finished 3D scan creating a 3D scan intersection. As described with reference to FIG. 5D, between the time the 2D detected region of interest is marked, and the 3D scan is finished, the location of the 2D detected region of interest may move along with shifts in the underlying 3D grid. As such, the location of the underlying region of interest may have moved as well. At operation 1230, the area around the 3D scan intersection, which may be mesh faces within a 3D mesh, is checked for mesh faces with a similar orientation to the mesh face at the 3D scan intersection. These mesh faces may be adjacent mesh faces. When an adjacent mesh face with a similar orientation is discovered, adjacent faces to this discovered mesh face may be checked, and so on. These mesh faces with a similar orientation are then marked as a portion of the region of interest. Once a portion of the region of interest has been discovered, this may be determined to be a wall floor plan portion. This wall floor plan portion may be flattened into a 2D marker by flattening the marker such that the flattened portion runs parallel to the floor. The floor may be determined by the compass and other orientations automatically determined by the 2D camera and LiDAR created 3D scan.

At operation 1235, the flattened region of interest is extended. A nearby flattened region of interest may also be extended such that the extended regions make a corner. At operation 1240, a floor plan is created by connecting a series of regions of interest. This is described with reference to FIGS. 8A to 8F. At operation 1245, a building is assembled. Individual rooms are assembled into a floor plan of an entire building. As much of the assembly as possible is automated. For example, when it can be determined that two scans share information, such as a coordinate system, compass, headings, etc., that shared information may be used to aid the user in assembling a floor plan. For example, separate areas may have shared compass readings, so the compass readings can be used to orient the areas together. Areas in the same session (as shown with reference to FIG. 6) may use the same coordinates, so each may be positioned relative to each other, and so on.

Figure 13A:
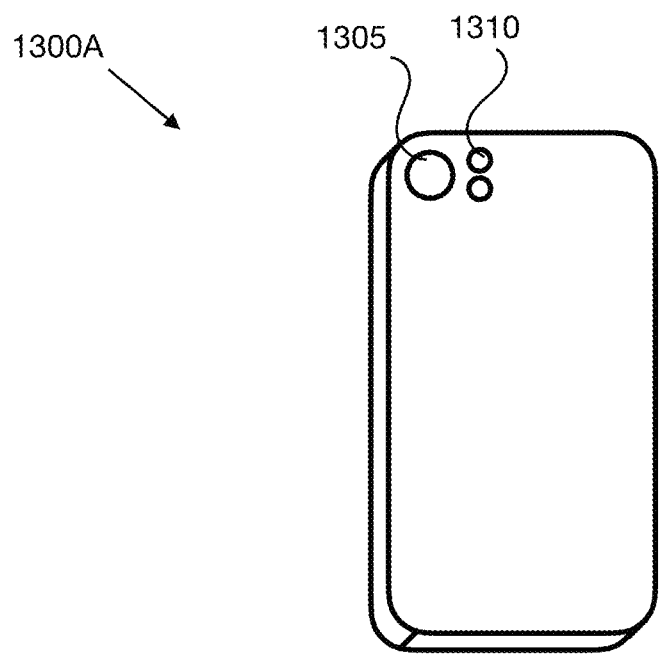
FIG. 13A is a diagram of the back of an exemplary scanner that may be used in some described embodiments.
Figure 13B:
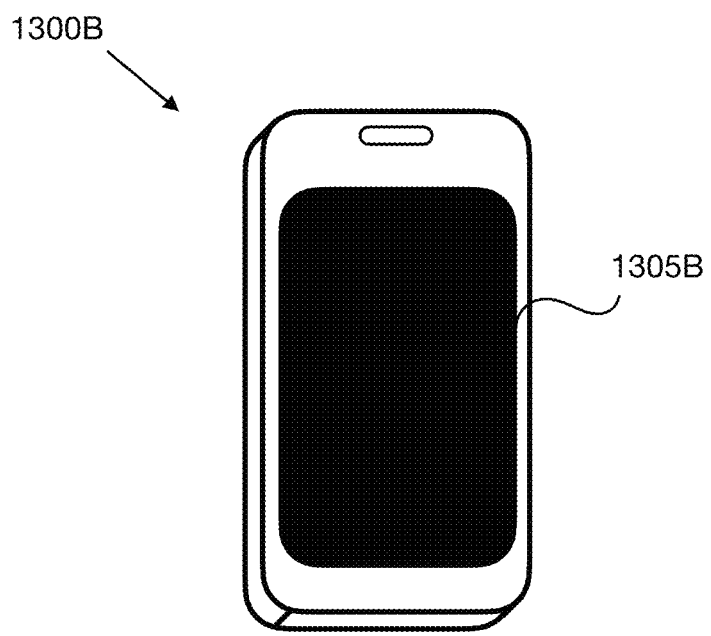
FIG. 13B is a diagram of the front of an exemplary scanner that may be used in some described embodiments.

FIGS. 13A at 1300A and 13B at 1300B are the back and front of an exemplary scanner that may be used in some described embodiments. That is, the system as described in FIG. 1 may be implemented using a mobile phone 1300A or another portable computing device with a 2D camera 1305A and a depth scanner 1310A. In some implementations, the system includes a user input device. This user input/output device may be a touchscreen 1305B. The screens shown with reference to FIGS. 5A-5E and FIG. 9 may be implemented on such a touchscreen 1305B.

Figure 14A:
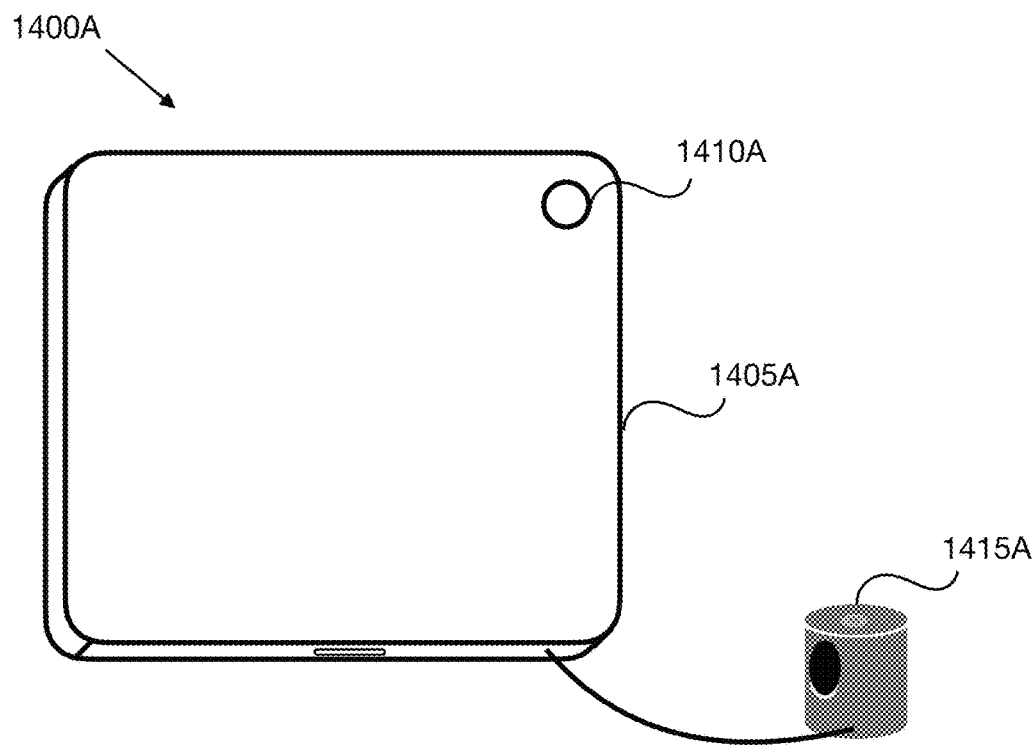
FIG. 14A is a diagram of the back of an exemplary scanner that may be used in some described embodiments.
Figure 14B:
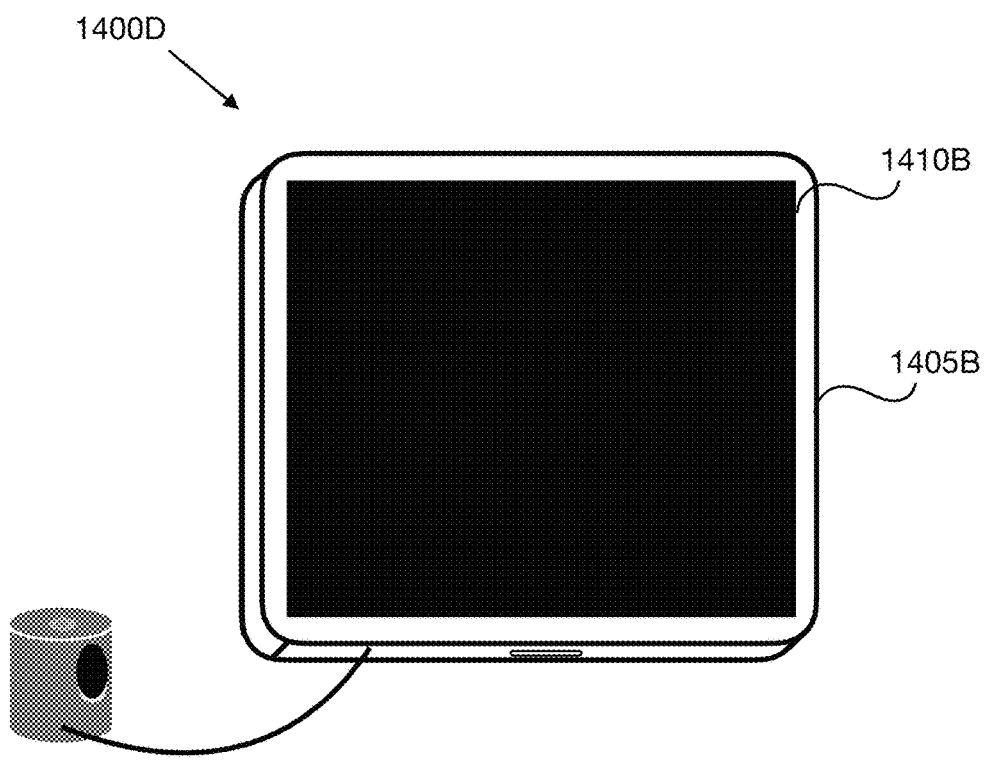
FIG. 14B is a diagram of the front of an exemplary scanner that may be used in some described embodiments.

FIGS. 14A at 1400A and 14B at 1400B are the back and front of an exemplary tablet scanner that may be used in some described embodiments. That is, the system as described in FIG. 1 may be implemented using a tablet (e.g., an iPad, a Surface, a Thinkpad, etc.), or another portable computing device 1405A with a camera 11410C and an attached external 3D scanner 1415A. In some implementations, the depth scanner in integrated into the tablet. In some implementations, the system includes a user input/output device. This user input/output device may be a touchscreen 1505B. In some embodiments, a keyboard and a non-touch screen may be used. The screens shown with reference to FIGS. 5A-5E and FIG. 9 may be implemented on such a touchscreen 1405B.

In view of the many possible embodiments to which the principles of the technology may be applied, it should be recognized that the illustrated embodiments are examples and should not be taken as a limitation on the scope of the invention. For instance, various components of systems and tools described herein may be combined in function and use. We, therefore, claim as our invention all subject matter that comes within the scope and spirit of these claims.

I claim:

1. A method of detecting a region of interest in an image of a space, the method comprising:
    obtaining a plurality of depth measurements captured by a depth sensor attached to a device, the plurality of depth measurements defining distances from the depth sensor to respective points in the space using a three dimensional grid;
    declaring those depth measurements a portion of the space;
    obtaining a detected region of interest in the image of the portion of the space, captured by a machine learning recognition system using two dimensions of the three dimensional grid;
    mapping the detected region of interest onto the three dimensional grid in two dimensions to make a two dimensional detected region of interest;
    obtaining a finished depth measurement three dimensional grid of the space;
    projecting the detected region of interest onto the finished depth measurement three dimensional grid of the space to make a projected three dimensional shape;
    discovering an intersection between the projected three dimensional shape and the finished depth measurement three dimensional grid of the space as a region of interest; and
    generating a floor plan of the space including a representation based on the detected region of interest and the discovered intersection.

2. The method of claim 1, wherein the machine learning recognition system is associated with a 2D camera and wherein the two dimensions of the three dimensional grid are transformed from a 2D grid created by the 2D camera.

3. The method of claim 2, wherein obtaining a detected region of interest in the portion of the space comprises accepting an annotation placement on a surface of a representation of the 2D grid.

4. The method of claim 3, wherein projecting the two dimensional detected region of interest onto the finished depth measurement three dimensional grid of the space to make a projected three dimensional shape comprises creating a ray that intersects the three dimensional grid using the annotation placement, creating several intersection points.

5. The method of claim 4, wherein adjacent faces of the intersection point are identified to create a wall portion.

6. The method of claim 5, wherein the wall portion is flattened along a z axis, with a marker pointing to an inside of the space, creating a 2D marker oriented in space.

7. The method of claim 6, wherein there are multiple 2D markers and wherein the multiple 2-D markers oriented in space are extended to create a 2-D outline of the space.

8. The method of claim 3, further comprising placing a marker on the surface of a representation of the 2D grid marking a wall associated with the annotation placement.

9. The method of claim 1, wherein obtaining a detected region of interest in the portion of the space comprises capturing the detected region of interest using a two dimensional camera with image recognition software using a transformation of two dimensions of the three dimensional grid.

10. The method of claim 9, wherein capturing the detected region of interest using a two dimensional camera with image recognition software using two dimensions of the three dimensional grid further comprises capturing at least three points that correspond to object corners.

11. A system to generate a 3D scan of a space with regions of interest marked, the system comprising:
 a 3D scanner operationally able to scan a portion of a space in three dimensions creating a 3D scan portion, and operationally able to scan a whole space creating a whole 3D scan;
 a 2D scanner operationally connected to the 3D scanner, the 2D scanner operationally able to use machine learning to detect regions of interest within a 2D scan and operationally able to mark the regions of interest in the 2D scan using two of the three dimensions from the 3D scan portion;
  a combiner operationally able to mark the regions of interest within the 2D scan with two dimensions of the 3D scan portion to create a ray;
  a post processor operationally able to position the ray with the whole 3D scan to create a 3D scan of a space with the regions of interest marked; and
  generate a floor plan of the space including a representation based on 3D scan of the space and marked regions of interest.

12. The system of claim 11, wherein the comprise walls, doors, windows, or equipment.

13. The system of claim 12, wherein the post processor is operationally able to determine a wall portion by intersecting the ray with the whole 3D scan along a third dimension axis.

14. A non-transitory computer readable storage medium storing instructions for capturing of regions of interest wherein the instructions when executed by a processor, cause the processor to perform steps including:
 receiving, by a LiDAR system mounted on a device, a partial 3D scan of a space;
 receiving by a 2D camera mounted on the device a 2D detected region of interest;
 marking the 2D detected region of interest within the partial 3D scan creating a 2D marked ROI;
 receiving a finished 3D scan;
 marking an intersection of the 2D marked ROI in the finished 3D scan as a marked region of interest; and
 generating a floor plan of the space including a representation based on the marked region of interest.

15. The non-transitory computer readable storage medium of claim 14, wherein receiving by a 2D camera mounted on the device a 2D detected region of interest comprises accepting 2D user input marking the 2D detected region of interest.

16. The non-transitory computer readable storage medium of claim 15, further comprising:
 receiving by a 2D camera mounted on the device a second 2D detected region of interest;
 marking the second 2D detected region of interest within the partial 3D scan in two dimensions;
 intersecting the second 2D detected region of interest with the finished 3D scan creating a second 3D scan intersection;
 marking the second 3D scan intersection as a second marked 2D region of interest;
 extending the 2D detected region of interest and the marked second 2D detected region of interest to an intersection point to create an extended 2D detected region of interest and a second extended 2D detected region of interest; and
 marking the extended 2D detected region of interest and the second extended 2D detected region of interest as a wall floor plan portion.

17. The non-transitory computer readable storage medium of claim 16, wherein intersecting the 2D detected region of interest with the finished 3D scan creating a 3D scan intersection further comprises identifying adjacent faces with a similar orientation within the finished 3D scan; and wherein intersecting the 2D detected region of interest with the finished 3D scan creating a 3D scan intersection comprises flattening the wall floor plan portion into a 2D marker.

18. The non-transitory computer readable storage medium of claim 17, wherein receiving e a 2D detected region of interest comprises a machine learning image recognition system using a camera feed from the 2D camera mounted on the device to detect a region of interest.

19. The non-transitory computer readable storage medium of claim 18, wherein intersecting the second 2D detected region of interest with the finished 3D scan creating a second 3D scan intersection comprises:
 locating a surface on the finished 3D scan;
 creating a 3D extension of three points of user interest marking the region around a ray at 90° to the surface of the finished 3D scan; and
 marking an intersection of the 3D extension of the three points of user interest with the finished 3D scan as the region of interest.

20. The non-transitory computer readable storage medium of claim 14, wherein the 2D detects region of interest is a 2D representation of a wall, a door, a window, a bookcase, a desk, a light fixture, a table, or a sensor.

* * * * *